(12) United States Patent
Lasiter

(10) Patent No.: US 8,971,675 B2
(45) Date of Patent: Mar. 3, 2015

(54) INTERCONNECT STRUCTURE FOR MEMS DEVICE

(75) Inventor: Jon Bradley Lasiter, Stockton, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 301 days.

(21) Appl. No.: 13/073,922

(22) Filed: Mar. 28, 2011

(65) Prior Publication Data

US 2011/0177745 A1 Jul. 21, 2011

Related U.S. Application Data

(63) Continuation of application No. 11/331,705, filed on Jan. 13, 2006, now Pat. No. 7,916,980.

(51) Int. Cl.
 *G02F 1/01* (2006.01)
 *G02B 26/00* (2006.01)
(52) U.S. Cl.
 CPC .................................. *G02B 26/001* (2013.01)
 USPC ......................................................... 385/14
(58) Field of Classification Search
 USPC .......................................................... 385/1
 See application file for complete search history.

(56) References Cited

U.S. PATENT DOCUMENTS

| | | |
|---|---|---|
| 2,518,647 A | 8/1950 | Teeple et al. |
| 2,534,846 A | 12/1950 | Ambrose et al. |
| 2,588,792 A | 3/1952 | Wilson |
| 2,590,906 A | 4/1952 | Tripp |
| 2,677,714 A | 5/1954 | Auwarter |
| 3,037,189 A | 5/1962 | Barrett et al. |
| 3,184,600 A | 5/1965 | Potter |
| 3,210,757 A | 10/1965 | Jacob |
| 3,247,392 A | 4/1966 | Thelen |
| 3,296,530 A | 1/1967 | Brooks |
| 3,371,345 A | 2/1968 | Bernard |
| 3,410,363 A | 11/1968 | Edmund |
| 3,439,973 A | 4/1969 | Bernt et al. |
| 3,443,854 A | 5/1969 | Herbert |
| 3,448,334 A | 6/1969 | John |
| 3,653,741 A | 4/1972 | Marks |
| 3,656,836 A | 4/1972 | Baudoin et al. |
| 3,661,461 A | 5/1972 | Dessauer |
| 3,679,313 A | 7/1972 | Robert |
| 3,701,586 A | 10/1972 | Goetz |
| 3,725,868 A | 4/1973 | Malmer et al. |

(Continued)

FOREIGN PATENT DOCUMENTS

| | | |
|---|---|---|
| CA | 2490975 A1 | 1/2004 |
| CH | 680534 | 9/1992 |

(Continued)

OTHER PUBLICATIONS

Fork, et al., Chip on Glass Bonding Using StressedMetalTM Technology, SID 05 Digest, pp. 534-537, 2005.

(Continued)

*Primary Examiner* — Uyen Chau N Le
*Assistant Examiner* — Hoang Tran
(74) *Attorney, Agent, or Firm* — Knobbe Martens Olson & Bear LLP

(57) ABSTRACT

An interferometric modulator array is formed with connectors and/or an encapsulation layer with electrical connections. The encapsulation layer hermetically seals the array. Circuitry may also be formed over the array.

14 Claims, 10 Drawing Sheets

(56) References Cited

U.S. PATENT DOCUMENTS

| | | |
|---|---|---|
| 3,728,030 A | 4/1973 | Hawes |
| 3,746,785 A | 7/1973 | Goodrich |
| 3,813,265 A | 5/1974 | Marks |
| 3,886,310 A | 5/1975 | Guldberg et al. |
| 3,924,929 A | 12/1975 | Holmen et al. |
| 3,955,190 A | 5/1976 | Teraishi |
| 3,955,880 A | 5/1976 | Lierke |
| 3,982,239 A | 9/1976 | Sherr |
| 4,087,810 A | 5/1978 | Hung et al. |
| 4,099,854 A | 7/1978 | Decker et al. |
| 4,125,868 A | 11/1978 | Hruby et al. |
| 4,154,219 A | 5/1979 | Gupta et al. |
| 4,158,718 A | 6/1979 | Kehl et al. |
| 4,190,488 A | 2/1980 | Winters |
| 4,196,396 A | 4/1980 | Smith |
| 4,200,472 A | 4/1980 | Chappell et al. |
| 4,215,244 A | 7/1980 | Gutleber |
| 4,228,437 A | 10/1980 | Shelton |
| 4,282,862 A | 8/1981 | Soleau |
| 4,287,449 A | 9/1981 | Takeda et al. |
| 4,299,450 A | 11/1981 | Funada et al. |
| 4,347,983 A | 9/1982 | Bodai |
| 4,375,312 A | 3/1983 | Tangonan |
| 4,377,324 A | 3/1983 | Durand et al. |
| 4,378,567 A | 3/1983 | Mir |
| 4,389,096 A | 6/1983 | Hori et al. |
| 4,392,711 A | 7/1983 | Moraw et al. |
| 4,400,577 A | 8/1983 | Spear |
| 4,403,248 A | 9/1983 | Te Velde |
| 4,408,181 A | 10/1983 | Nakayama |
| 4,421,381 A | 12/1983 | Ueda et al. |
| 4,425,572 A | 1/1984 | Takafuji et al. |
| 4,441,789 A | 4/1984 | Pohlack |
| 4,441,791 A | 4/1984 | Hornbeck |
| 4,445,050 A | 4/1984 | Marks |
| 4,459,182 A | 7/1984 | Te Velde |
| 4,482,213 A | 11/1984 | Piliavin et al. |
| 4,484,179 A | 11/1984 | Kasday |
| 4,497,974 A | 2/1985 | Deckman et al. |
| 4,498,953 A | 2/1985 | Cook et al. |
| 4,500,171 A | 2/1985 | Penz et al. |
| 4,518,959 A | 5/1985 | Ueda et al. |
| 4,519,676 A | 5/1985 | Te Velde |
| 4,531,126 A | 7/1985 | Sadones |
| 4,560,435 A | 12/1985 | Brown et al. |
| 4,566,935 A | 1/1986 | Hornbeck |
| 4,571,603 A | 2/1986 | Hornbeck et al. |
| 4,596,992 A | 6/1986 | Hornbeck |
| 4,615,595 A | 10/1986 | Hornbeck |
| 4,626,840 A | 12/1986 | Glasper et al. |
| 4,633,031 A | 12/1986 | Todorof |
| 4,655,554 A | 4/1987 | Armitage |
| 4,662,746 A | 5/1987 | Hornbeck |
| 4,663,083 A | 5/1987 | Marks |
| 4,666,254 A | 5/1987 | Itoh et al. |
| 4,672,254 A | 6/1987 | Dolat et al. |
| 4,681,403 A | 7/1987 | Te Velde et al. |
| 4,688,068 A | 8/1987 | Chaffin et al. |
| 4,705,361 A | 11/1987 | Frazier et al. |
| 4,709,995 A | 12/1987 | Kuribayashi et al. |
| 4,710,732 A | 12/1987 | Hornbeck |
| 4,748,366 A | 5/1988 | Taylor |
| 4,779,959 A | 10/1988 | Saunders |
| 4,786,128 A | 11/1988 | Birnbach |
| 4,790,635 A | 12/1988 | Apsley |
| 4,822,993 A | 4/1989 | Dillon et al. |
| 4,825,262 A | 4/1989 | Mallinson |
| 4,832,459 A | 5/1989 | Harper et al. |
| 4,850,682 A | 7/1989 | Gerritsen |
| 4,856,863 A | 8/1989 | Sampsell et al. |
| 4,857,978 A | 8/1989 | Goldburt et al. |
| 4,859,060 A | 8/1989 | Katagiri et al. |
| 4,863,224 A | 9/1989 | Afian et al. |
| 4,863,245 A | 9/1989 | Roxlo |
| 4,864,290 A | 9/1989 | Waters |
| 4,880,493 A | 11/1989 | Ashby et al. |
| 4,896,033 A | 1/1990 | Gautier |
| 4,900,136 A | 2/1990 | Goldburt et al. |
| 4,900,395 A | 2/1990 | Syverson et al. |
| 4,918,577 A | 4/1990 | Furudate |
| 4,925,259 A | 5/1990 | Emmett |
| 4,937,496 A | 6/1990 | Neiger et al. |
| 4,952,034 A | 8/1990 | Azusawa et al. |
| 4,954,789 A | 9/1990 | Sampsell |
| 4,956,213 A | 9/1990 | Masuda |
| 4,956,619 A | 9/1990 | Hornbeck |
| 4,961,617 A | 10/1990 | Shahidi et al. |
| 4,963,245 A | 10/1990 | Weetall |
| 4,963,859 A | 10/1990 | Parks |
| 4,965,562 A | 10/1990 | Verhulst |
| 4,973,131 A | 11/1990 | Carnes |
| 4,974,942 A | 12/1990 | Gross et al. |
| 4,977,009 A | 12/1990 | Anderson et al. |
| 4,980,775 A | 12/1990 | Brody |
| 4,982,184 A | 1/1991 | Kirkwood |
| 4,985,312 A | 1/1991 | Furuya et al. |
| 5,018,256 A | 5/1991 | Hornbeck |
| 5,022,745 A | 6/1991 | Zayhowski et al. |
| 5,028,939 A | 7/1991 | Hornbeck et al. |
| 5,034,351 A | 7/1991 | Sun et al. |
| 5,037,173 A | 8/1991 | Sampsell et al. |
| 5,044,736 A | 9/1991 | Jaskie et al. |
| 5,050,946 A | 9/1991 | Hathaway et al. |
| 5,055,833 A | 10/1991 | Hehlen et al. |
| 5,061,049 A | 10/1991 | Hornbeck |
| 5,062,689 A | 11/1991 | Koehler |
| 5,075,796 A | 12/1991 | Schildkraut et al. |
| 5,078,479 A | 1/1992 | Vuilleumier |
| 5,079,544 A | 1/1992 | Demond et al. |
| 5,083,857 A | 1/1992 | Hornbeck |
| 5,091,983 A | 2/1992 | Lukosz |
| 5,096,279 A | 3/1992 | Hornbeck et al. |
| 5,099,353 A | 3/1992 | Hornbeck |
| 5,110,370 A | 5/1992 | Vogeli et al. |
| 5,114,226 A | 5/1992 | Goodwin et al. |
| 5,123,247 A | 6/1992 | Nelson |
| 5,124,834 A | 6/1992 | Cusano et al. |
| 5,126,836 A | 6/1992 | Um |
| 5,136,669 A | 8/1992 | Gerdt |
| 5,142,405 A | 8/1992 | Hornbeck |
| 5,142,414 A | 8/1992 | Koehler |
| 5,148,157 A | 9/1992 | Florence |
| 5,151,585 A | 9/1992 | Siebert |
| 5,153,771 A | 10/1992 | Link et al. |
| 5,162,787 A | 11/1992 | Thompson et al. |
| 5,168,406 A | 12/1992 | Nelson |
| 5,170,156 A | 12/1992 | Demond et al. |
| 5,170,283 A | 12/1992 | O'Brien et al. |
| 5,172,262 A | 12/1992 | Hornbeck |
| 5,179,274 A | 1/1993 | Sampsell |
| 5,185,660 A | 2/1993 | Um |
| 5,190,637 A | 3/1993 | Guckel |
| 5,192,395 A | 3/1993 | Boysel et al. |
| 5,192,946 A | 3/1993 | Thompson et al. |
| 5,198,644 A | 3/1993 | Pfeiffer et al. |
| 5,206,629 A | 4/1993 | Demond et al. |
| 5,206,632 A | 4/1993 | Dupont et al. |
| 5,206,747 A | 4/1993 | Wiley et al. |
| 5,212,582 A | 5/1993 | Nelson |
| 5,214,419 A | 5/1993 | Demond et al. |
| 5,214,420 A | 5/1993 | Thompson et al. |
| 5,216,537 A | 6/1993 | Hornbeck |
| 5,218,472 A | 6/1993 | Jozefowicz et al. |
| 5,226,099 A | 7/1993 | Mignardi et al. |
| 5,227,900 A | 7/1993 | Inaba et al. |
| 5,228,013 A | 7/1993 | Bik |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,244,707 A | 9/1993 | Shores |
| 5,252,142 A | 10/1993 | Matsuyama et al. |
| 5,254,980 A | 10/1993 | Hendrix et al. |
| 5,255,093 A | 10/1993 | Topper et al. |

(56) References Cited

U.S. PATENT DOCUMENTS

| | | |
|---|---|---|
| 5,261,970 A | 11/1993 | Landis et al. |
| 5,262,667 A | 11/1993 | Hirai |
| 5,272,473 A | 12/1993 | Thompson et al. |
| 5,278,652 A | 1/1994 | Urbanus et al. |
| 5,280,277 A | 1/1994 | Hornbeck |
| 5,285,196 A | 2/1994 | Gale |
| 5,287,096 A | 2/1994 | Thompson et al. |
| 5,287,215 A | 2/1994 | Warde et al. |
| 5,291,314 A | 3/1994 | Agranat et al. |
| 5,293,272 A | 3/1994 | Jannson et al. |
| 5,296,950 A | 3/1994 | Lin et al. |
| 5,304,419 A | 4/1994 | Shores |
| 5,305,640 A | 4/1994 | Boysel et al. |
| 5,311,360 A | 5/1994 | Bloom et al. |
| 5,312,512 A | 5/1994 | Allman et al. |
| 5,312,513 A | 5/1994 | Florence et al. |
| 5,315,370 A | 5/1994 | Bulow |
| 5,323,002 A | 6/1994 | Sampsell et al. |
| 5,324,683 A | 6/1994 | Fitch et al. |
| 5,325,116 A | 6/1994 | Sampsell |
| 5,326,430 A | 7/1994 | Cronin et al. |
| 5,327,286 A | 7/1994 | Sampsell et al. |
| 5,331,454 A | 7/1994 | Hornbeck |
| 5,337,191 A | 8/1994 | Austin |
| 5,339,116 A | 8/1994 | Urbanus et al. |
| 5,339,179 A | 8/1994 | Rudisill et al. |
| 5,341,242 A | 8/1994 | Gilboa et al. |
| 5,345,322 A | 9/1994 | Fergason |
| 5,345,328 A | 9/1994 | Fritz et al. |
| 5,353,114 A | 10/1994 | Hansen |
| 5,355,181 A | 10/1994 | Ashizaki et al. |
| 5,355,357 A | 10/1994 | Yamamori et al. |
| 5,356,488 A | 10/1994 | Hezel |
| 5,358,601 A | 10/1994 | Cathey |
| 5,358,806 A | 10/1994 | Haraichi et al. |
| 5,361,383 A | 11/1994 | Chang et al. |
| 5,365,283 A | 11/1994 | Doherty et al. |
| 5,381,040 A | 1/1995 | Sun et al. |
| 5,381,232 A | 1/1995 | Van Wijk |
| 5,381,253 A | 1/1995 | Sharp et al. |
| 5,396,593 A | 3/1995 | Mori et al. |
| 5,398,125 A | 3/1995 | Willett et al. |
| 5,398,170 A | 3/1995 | Lee |
| 5,401,983 A | 3/1995 | Jokerst et al. |
| 5,411,769 A | 5/1995 | Hornbeck |
| 5,422,310 A | 6/1995 | Ito |
| 5,444,566 A | 8/1995 | Gale et al. |
| 5,446,479 A | 8/1995 | Thompson et al. |
| 5,448,314 A | 9/1995 | Heimbuch et al. |
| 5,448,659 A | 9/1995 | Tsutsui et al. |
| 5,450,205 A | 9/1995 | Sawin et al. |
| 5,452,024 A | 9/1995 | Sampsell |
| 5,452,138 A | 9/1995 | Mignardi et al. |
| 5,452,385 A | 9/1995 | Izumi et al. |
| 5,454,904 A | 10/1995 | Ghezzo et al. |
| 5,454,906 A | 10/1995 | Baker et al. |
| 5,457,493 A | 10/1995 | Leddy et al. |
| 5,457,566 A | 10/1995 | Sampsell et al. |
| 5,457,900 A | 10/1995 | Roy et al. |
| 5,459,602 A | 10/1995 | Sampsell |
| 5,459,610 A | 10/1995 | Bloom et al. |
| 5,461,411 A | 10/1995 | Florence et al. |
| 5,467,417 A | 11/1995 | Nakamura et al. |
| 5,471,341 A | 11/1995 | Warde et al. |
| 5,474,865 A | 12/1995 | Vasudev |
| 5,481,385 A | 1/1996 | Zimmerman et al. |
| 5,483,260 A | 1/1996 | Parks et al. |
| 5,485,304 A | 1/1996 | Kaeriyama |
| 5,488,505 A | 1/1996 | Engle |
| 5,489,952 A | 2/1996 | Gove et al. |
| 5,497,172 A | 3/1996 | Doherty et al. |
| 5,497,197 A | 3/1996 | Gove et al. |
| 5,499,037 A | 3/1996 | Nakagawa et al. |
| 5,499,062 A | 3/1996 | Urbanus |
| 5,500,635 A | 3/1996 | Mott |
| 5,500,761 A | 3/1996 | Goossen et al. |
| 5,506,597 A | 4/1996 | Thompson et al. |
| 5,508,841 A | 4/1996 | Lin et al. |
| 5,515,076 A | 5/1996 | Thompson et al. |
| 5,515,184 A | 5/1996 | Caulfield et al. |
| 5,517,347 A | 5/1996 | Sampsell |
| 5,523,803 A | 6/1996 | Urbanus et al. |
| 5,526,051 A | 6/1996 | Gove et al. |
| 5,526,172 A | 6/1996 | Kanack |
| 5,526,327 A | 6/1996 | Cordova, Jr. |
| 5,526,688 A | 6/1996 | Boysel et al. |
| 5,526,951 A | 6/1996 | Bailey et al. |
| 5,528,707 A | 6/1996 | Sullivan et al. |
| 5,530,240 A | 6/1996 | Larson et al. |
| 5,535,047 A | 7/1996 | Hornbeck |
| 5,544,268 A | 8/1996 | Bischel et al. |
| 5,548,301 A | 8/1996 | Kornher et al. |
| 5,550,373 A | 8/1996 | Cole et al. |
| 5,551,293 A | 9/1996 | Boysel et al. |
| 5,552,924 A | 9/1996 | Tregilgas |
| 5,552,925 A | 9/1996 | Worley |
| 5,555,160 A | 9/1996 | Tawara et al. |
| 5,559,358 A | 9/1996 | Burns et al. |
| 5,561,523 A | 10/1996 | Blomberg et al. |
| 5,563,398 A | 10/1996 | Sampsell |
| 5,567,334 A | 10/1996 | Baker et al. |
| 5,569,332 A | 10/1996 | Glatfelter et al. |
| 5,569,565 A | 10/1996 | Kawakami et al. |
| 5,570,135 A | 10/1996 | Gove et al. |
| 5,578,140 A | 11/1996 | Yogev et al. |
| 5,578,976 A | 11/1996 | Yao |
| 5,579,149 A | 11/1996 | Moret et al. |
| 5,580,144 A | 12/1996 | Stroomer |
| 5,581,272 A | 12/1996 | Conner et al. |
| 5,583,688 A | 12/1996 | Hornbeck |
| 5,589,852 A | 12/1996 | Thompson et al. |
| 5,591,379 A | 1/1997 | Shores |
| 5,592,332 A | 1/1997 | Nishio et al. |
| 5,594,830 A | 1/1997 | Winston et al. |
| 5,597,736 A | 1/1997 | Sampsell |
| 5,598,565 A | 1/1997 | Reinhardt |
| 5,600,383 A | 2/1997 | Hornbeck |
| 5,602,671 A | 2/1997 | Hornbeck |
| 5,604,607 A | 2/1997 | Mirzaoff |
| 5,606,441 A | 2/1997 | Florence et al. |
| 5,608,468 A | 3/1997 | Gove et al. |
| 5,610,438 A | 3/1997 | Wallace et al. |
| 5,610,624 A | 3/1997 | Bhuva |
| 5,610,625 A | 3/1997 | Sampsell |
| 5,612,713 A | 3/1997 | Bhuva et al. |
| 5,614,937 A | 3/1997 | Nelson |
| 5,619,019 A | 4/1997 | Yoshimura et al. |
| 5,619,059 A | 4/1997 | Li et al. |
| 5,619,061 A | 4/1997 | Goldsmith et al. |
| 5,619,365 A | 4/1997 | Rhoads et al. |
| 5,619,366 A | 4/1997 | Rhoads et al. |
| 5,629,790 A | 5/1997 | Neukermans et al. |
| 5,633,652 A | 5/1997 | Kanbe et al. |
| 5,633,739 A | 5/1997 | Matsuyama et al. |
| 5,636,052 A | 6/1997 | Arney et al. |
| 5,636,185 A | 6/1997 | Brewer et al. |
| 5,638,084 A | 6/1997 | Kalt |
| 5,638,946 A | 6/1997 | Zavracky |
| 5,641,391 A | 6/1997 | Hunter et al. |
| 5,646,729 A | 7/1997 | Koskinen et al. |
| 5,646,768 A | 7/1997 | Kaeriyama |
| 5,647,036 A | 7/1997 | Deacon et al. |
| 5,650,834 A | 7/1997 | Nakagawa et al. |
| 5,650,865 A | 7/1997 | Smith |
| 5,650,881 A | 7/1997 | Hornbeck |
| 5,654,741 A | 8/1997 | Sampsell et al. |
| 5,654,819 A | 8/1997 | Goossen et al. |
| 5,656,554 A | 8/1997 | Desai et al. |
| 5,657,099 A | 8/1997 | Doherty et al. |
| 5,659,374 A | 8/1997 | Gale, Jr. et al. |
| 5,659,410 A | 8/1997 | Koike et al. |
| 5,661,591 A | 8/1997 | Lin et al. |
| 5,661,592 A | 8/1997 | Bornstein et al. |
| 5,665,997 A | 9/1997 | Weaver et al. |

(56) References Cited

U.S. PATENT DOCUMENTS

| | | | |
|---|---|---|---|
| 5,671,314 A | 9/1997 | Gregory et al. | |
| 5,671,994 A | 9/1997 | Tai et al. | |
| 5,673,128 A | 9/1997 | Ohta et al. | |
| 5,673,139 A | 9/1997 | Johnson | |
| 5,673,785 A | 10/1997 | Schlaak et al. | |
| 5,677,783 A | 10/1997 | Bloom et al. | |
| 5,683,591 A | 11/1997 | Offenberg | |
| 5,683,649 A | 11/1997 | Chatterjee et al. | |
| 5,686,979 A | 11/1997 | Weber et al. | |
| 5,699,074 A | 12/1997 | Sutherland et al. | |
| 5,699,075 A | 12/1997 | Miyamoto | |
| 5,699,181 A | 12/1997 | Choi | |
| 5,703,667 A | 12/1997 | Ochiai | |
| 5,703,710 A | 12/1997 | Brinkman et al. | |
| 5,710,656 A | 1/1998 | Goossen | |
| 5,712,694 A | 1/1998 | Taira et al. | |
| 5,719,068 A | 2/1998 | Suzawa et al. | |
| 5,720,827 A | 2/1998 | Simmons | |
| 5,726,480 A | 3/1998 | Pister | |
| 5,734,177 A | 3/1998 | Sakamoto | |
| 5,735,590 A | 4/1998 | Kashima et al. | |
| 5,737,050 A | 4/1998 | Takahara et al. | |
| 5,737,115 A | 4/1998 | Mackinlay et al. | |
| 5,739,945 A | 4/1998 | Tayebati | |
| 5,740,150 A | 4/1998 | Uchimaru et al. | |
| 5,745,193 A | 4/1998 | Urbanus et al. | |
| 5,745,281 A | 4/1998 | Yi et al. | |
| 5,751,469 A | 5/1998 | Arney et al. | |
| 5,754,160 A | 5/1998 | Shimizu et al. | |
| 5,754,260 A | 5/1998 | Ooi et al. | |
| 5,757,536 A | 5/1998 | Ricco et al. | |
| 5,763,785 A | 6/1998 | Chiang | |
| 5,771,116 A | 6/1998 | Miller et al. | |
| 5,771,124 A | 6/1998 | Kintz et al. | |
| 5,771,321 A | 6/1998 | Stern | |
| 5,782,993 A | 7/1998 | Ponewash | |
| 5,782,995 A | 7/1998 | Nanya et al. | |
| 5,783,614 A | 7/1998 | Chen et al. | |
| 5,784,189 A | 7/1998 | Bozler et al. | |
| 5,784,190 A | 7/1998 | Worley | |
| 5,784,212 A | 7/1998 | Hornbeck | |
| 5,786,927 A | 7/1998 | Greywall | |
| 5,793,504 A | 8/1998 | Stoll | |
| 5,795,208 A | 8/1998 | Hattori | |
| 5,796,378 A | 8/1998 | Yoshida et al. | |
| 5,801,084 A | 9/1998 | Beasom et al. | |
| 5,805,117 A | 9/1998 | Mazurek et al. | |
| 5,808,708 A | 9/1998 | Oyama et al. | |
| 5,808,780 A | 9/1998 | McDonald | |
| 5,808,781 A | 9/1998 | Arney et al. | |
| 5,810,464 A | 9/1998 | Ishikawa et al. | |
| 5,815,141 A | 9/1998 | Phares | |
| 5,815,229 A | 9/1998 | Shapiro | |
| 5,818,095 A | 10/1998 | Sampsell | |
| 5,822,110 A | 10/1998 | Dabbaj et al. | |
| 5,822,839 A | 10/1998 | Ghosh et al. | |
| 5,825,528 A | 10/1998 | Goossen | |
| 5,827,215 A | 10/1998 | Yoon | |
| 5,835,255 A | 11/1998 | Miles | |
| 5,835,256 A | 11/1998 | Huibers | |
| 5,838,484 A | 11/1998 | Goossen | |
| 5,842,088 A | 11/1998 | Thompson | |
| 5,853,310 A | 12/1998 | Nishimura et al. | |
| 5,854,872 A | 12/1998 | Tai | |
| 5,867,301 A | 2/1999 | Engle | |
| 5,867,302 A | 2/1999 | Fleming | |
| 5,868,480 A | 2/1999 | Zeinali | |
| 5,870,221 A | 2/1999 | Goossen | |
| 5,877,874 A | 3/1999 | Rosenberg | |
| 5,880,921 A | 3/1999 | Tham et al. | |
| 5,881,449 A | 3/1999 | Ghosh et al. | |
| 5,883,684 A | 3/1999 | Millikan et al. | |
| 5,886,688 A | 3/1999 | Fifield et al. | |
| 5,892,598 A | 4/1999 | Asakawa et al. | |
| 5,894,686 A | 4/1999 | Parker et al. | |
| 5,905,482 A | 5/1999 | Hughes et al. | |
| 5,907,426 A | 5/1999 | Kato et al. | |
| 5,912,758 A | 6/1999 | Knipe et al. | |
| 5,913,594 A | 6/1999 | Iimura | |
| 5,914,803 A | 6/1999 | Hwang et al. | |
| 5,914,804 A | 6/1999 | Goossen | |
| 5,920,417 A | 7/1999 | Johnson | |
| 5,920,418 A | 7/1999 | Shiono et al. | |
| 5,920,421 A | 7/1999 | Choi | |
| 5,923,955 A * | 7/1999 | Wong | 438/108 |
| 5,933,183 A | 8/1999 | Enomoto et al. | |
| 5,939,795 A | 8/1999 | Yu | |
| 5,943,158 A | 8/1999 | Ford et al. | |
| 5,945,980 A | 8/1999 | Moissev et al. | |
| 5,949,571 A | 9/1999 | Goossen et al. | |
| 5,956,106 A | 9/1999 | Petersen et al. | |
| 5,959,763 A | 9/1999 | Bozler et al. | |
| 5,959,777 A | 9/1999 | Whitehead | |
| 5,961,198 A | 10/1999 | Hira et al. | |
| 5,961,848 A | 10/1999 | Jacquet et al. | |
| 5,963,788 A | 10/1999 | Barron et al. | |
| 5,966,235 A | 10/1999 | Walker | |
| 5,967,163 A | 10/1999 | Pan et al. | |
| 5,982,540 A | 11/1999 | Koike et al. | |
| 5,986,796 A | 11/1999 | Miles | |
| 5,991,073 A | 11/1999 | Woodgate et al. | |
| 5,994,174 A | 11/1999 | Carey et al. | |
| 5,999,239 A | 12/1999 | Larson | |
| 6,002,829 A | 12/1999 | Winston et al. | |
| 6,008,123 A | 12/1999 | Kook et al. | |
| 6,008,449 A | 12/1999 | Cole | |
| 6,014,192 A | 1/2000 | Lehureau et al. | |
| 6,021,007 A | 2/2000 | Murtha | |
| 6,028,689 A | 2/2000 | Michalicek et al. | |
| 6,028,690 A | 2/2000 | Carter et al. | |
| 6,031,653 A | 2/2000 | Wang | |
| 6,038,056 A | 3/2000 | Florence et al. | |
| 6,040,937 A | 3/2000 | Miles | |
| 6,046,659 A | 4/2000 | Loo et al. | |
| 6,046,840 A | 4/2000 | Huibers | |
| 6,048,071 A | 4/2000 | Sawayama | |
| 6,049,317 A | 4/2000 | Thompson et al. | |
| 6,055,090 A | 4/2000 | Miles | |
| 6,056,406 A | 5/2000 | Park | |
| 6,061,075 A | 5/2000 | Nelson et al. | |
| 6,068,382 A | 5/2000 | Fukui et al. | |
| 6,072,620 A | 6/2000 | Shiono et al. | |
| 6,073,034 A | 6/2000 | Jacobsen et al. | |
| 6,077,722 A | 6/2000 | Jansen et al. | |
| 6,088,102 A | 7/2000 | Manhart | |
| 6,091,469 A | 7/2000 | Naito | |
| 6,094,285 A | 7/2000 | Wickham et al. | |
| 6,097,145 A | 8/2000 | Kastalsky et al. | |
| 6,099,132 A | 8/2000 | Kaeriyama | |
| 6,099,134 A | 8/2000 | Taniguchi et al. | |
| 6,100,861 A | 8/2000 | Cohen et al. | |
| 6,100,872 A | 8/2000 | Aratani et al. | |
| 6,111,276 A | 8/2000 | Mauk | |
| 6,113,239 A | 9/2000 | Sampsell et al. | |
| 6,115,014 A | 9/2000 | Aoki et al. | |
| 6,123,431 A | 9/2000 | Teragaki et al. | |
| 6,124,851 A | 9/2000 | Jacobson | |
| 6,128,077 A | 10/2000 | Jovin et al. | |
| 6,142,358 A | 11/2000 | Cohn et al. | |
| 6,147,680 A | 11/2000 | Tareev | |
| 6,147,790 A | 11/2000 | Meier et al. | |
| 6,149,190 A | 11/2000 | Galvin et al. | |
| 6,151,089 A | 11/2000 | Yang et al. | |
| 6,158,156 A | 12/2000 | Patrick | |
| 6,160,833 A | 12/2000 | Floyd et al. | |
| 6,162,657 A | 12/2000 | Schiele et al. | |
| 6,165,890 A | 12/2000 | Kohl et al. | |
| 6,166,319 A | 12/2000 | Matsuyama | |
| 6,170,332 B1 | 1/2001 | MacDonald et al. | |
| 6,171,945 B1 | 1/2001 | Mandal et al. | |
| 6,172,667 B1 | 1/2001 | Sayag | |
| 6,172,797 B1 | 1/2001 | Huibers | |
| 6,180,428 B1 | 1/2001 | Peeters et al. | |
| 6,195,196 B1 | 2/2001 | Kimura et al. | |

(56) References Cited

U.S. PATENT DOCUMENTS

| | | |
|---|---|---|
| 6,196,691 B1 | 3/2001 | Ochiai |
| 6,201,633 B1 | 3/2001 | Peeters et al. |
| 6,204,080 B1 | 3/2001 | Hwang |
| 6,215,221 B1 | 4/2001 | Cabuz et al. |
| 6,222,511 B1 | 4/2001 | Stoller et al. |
| 6,229,084 B1 | 5/2001 | Katsu |
| 6,232,140 B1 | 5/2001 | Ferrari et al. |
| 6,232,936 B1 | 5/2001 | Gove et al. |
| 6,232,937 B1 | 5/2001 | Jacobsen et al. |
| 6,239,777 B1 | 5/2001 | Sugahara et al. |
| 6,242,932 B1 | 6/2001 | Hembree |
| 6,242,989 B1 | 6/2001 | Barber et al. |
| 6,243,149 B1 | 6/2001 | Swanson et al. |
| 6,246,398 B1 | 6/2001 | Koo |
| 6,259,082 B1 | 7/2001 | Fujimoto et al. |
| 6,259,854 B1 | 7/2001 | Shinji et al. |
| 6,262,696 B1 | 7/2001 | Seraphim et al. |
| 6,262,697 B1 | 7/2001 | Stephenson |
| 6,273,577 B1 | 8/2001 | Goto et al. |
| 6,275,220 B1 | 8/2001 | Nitta |
| 6,275,326 B1 | 8/2001 | Bhalla et al. |
| 6,282,010 B1 | 8/2001 | Sulzbach et al. |
| 6,285,424 B1 | 9/2001 | Yoshida |
| 6,288,472 B1 | 9/2001 | Cabuz et al. |
| 6,288,824 B1 | 9/2001 | Kastalsky |
| 6,295,154 B1 | 9/2001 | Laor et al. |
| 6,297,811 B1 | 10/2001 | Kent et al. |
| 6,300,558 B1 | 10/2001 | Takamoto et al. |
| 6,301,000 B1 | 10/2001 | Johnson |
| 6,304,297 B1 | 10/2001 | Swan |
| 6,310,729 B1 | 10/2001 | Tsukamoto |
| 6,316,289 B1 | 11/2001 | Chung |
| 6,322,901 B1 | 11/2001 | Bawendi et al. |
| 6,323,923 B1 | 11/2001 | Hoshino et al. |
| 6,323,982 B1 | 11/2001 | Hornbeck |
| 6,323,987 B1 | 11/2001 | Rinaudo et al. |
| 6,327,071 B1 | 12/2001 | Kimura |
| 6,331,909 B1 | 12/2001 | Dunfield |
| 6,335,235 B1 | 1/2002 | Bhakta et al. |
| 6,335,831 B2 | 1/2002 | Kowarz et al. |
| 6,339,417 B1 | 1/2002 | Quanrud |
| 6,342,970 B1 | 1/2002 | Sperger et al. |
| 6,351,329 B1 | 2/2002 | Greywall |
| 6,355,831 B1 | 3/2002 | Wu et al. |
| 6,356,085 B1 | 3/2002 | Ryat et al. |
| 6,356,254 B1 | 3/2002 | Kimura |
| 6,356,378 B1 | 3/2002 | Huibers |
| 6,358,021 B1 | 3/2002 | Cabuz |
| 6,376,787 B1 | 4/2002 | Martin et al. |
| 6,377,233 B2 | 4/2002 | Colgan et al. |
| 6,377,321 B1 | 4/2002 | Khan et al. |
| 6,381,022 B1 | 4/2002 | Zavracky |
| 6,384,952 B1 | 5/2002 | Clark et al. |
| 6,384,953 B1 | 5/2002 | Russell et al. |
| 6,395,863 B2 | 5/2002 | Geaghan |
| 6,400,738 B1 | 6/2002 | Tucker et al. |
| 6,407,851 B1 | 6/2002 | Islam et al. |
| 6,417,868 B1 | 7/2002 | Bock et al. |
| 6,424,094 B1 | 7/2002 | Feldman |
| 6,429,601 B1 | 8/2002 | Friend et al. |
| 6,433,917 B1 | 8/2002 | Mei et al. |
| 6,437,583 B1 | 8/2002 | Tartagni et al. |
| 6,438,282 B1 | 8/2002 | Takeda et al. |
| 6,446,486 B1 | 9/2002 | Deboer et al. |
| 6,447,126 B1 | 9/2002 | Hornbeck |
| 6,448,622 B1 | 9/2002 | Franke et al. |
| 6,449,084 B1 | 9/2002 | Guo |
| 6,452,712 B2 | 9/2002 | Atobe et al. |
| 6,456,301 B1 | 9/2002 | Huang |
| 6,456,420 B1 | 9/2002 | Goodwin-Johansson |
| 6,465,355 B1 | 10/2002 | Horsley |
| 6,466,190 B1 | 10/2002 | Evoy |
| 6,466,354 B1 | 10/2002 | Gudeman |
| 6,466,358 B2 | 10/2002 | Tew |
| 6,466,486 B2 | 10/2002 | Kawasumi |
| 6,473,072 B1 | 10/2002 | Comiskey et al. |
| 6,473,274 B1 | 10/2002 | Maimone et al. |
| 6,480,177 B2 | 11/2002 | Doherty et al. |
| 6,496,122 B2 | 12/2002 | Sampsell |
| 6,501,107 B1 | 12/2002 | Sinclair et al. |
| 6,504,589 B1 | 1/2003 | Kashima et al. |
| 6,507,330 B1 | 1/2003 | Handschy et al. |
| 6,507,331 B1 | 1/2003 | Schlangen et al. |
| 6,519,073 B1 | 2/2003 | Goossen |
| 6,520,643 B1 | 2/2003 | Holman et al. |
| 6,522,794 B1 | 2/2003 | Bischel et al. |
| 6,545,335 B1 | 4/2003 | Chua et al. |
| 6,548,908 B2 | 4/2003 | Chua et al. |
| 6,549,195 B2 | 4/2003 | Hikida et al. |
| 6,549,338 B1 | 4/2003 | Wolverton et al. |
| 6,552,840 B2 | 4/2003 | Knipe |
| 6,556,338 B2 | 4/2003 | Han et al. |
| 6,574,033 B1 | 6/2003 | Chui et al. |
| 6,589,625 B1 * | 7/2003 | Kothari et al. ................ 428/46 |
| 6,593,834 B2 | 7/2003 | Qiu et al. |
| 6,593,934 B1 | 7/2003 | Liaw et al. |
| 6,597,419 B1 | 7/2003 | Okada et al. |
| 6,597,490 B2 | 7/2003 | Tayebati |
| 6,600,201 B2 | 7/2003 | Hartwell et al. |
| 6,603,520 B2 | 8/2003 | Umemoto et al. |
| 6,606,175 B1 | 8/2003 | Sampsell et al. |
| 6,608,268 B1 | 8/2003 | Goldsmith |
| 6,618,187 B2 | 9/2003 | Pilossof |
| 6,620,712 B2 | 9/2003 | Huang et al. |
| 6,624,944 B1 | 9/2003 | Wallace et al. |
| 6,625,047 B2 | 9/2003 | Coleman, Jr. |
| 6,630,786 B2 | 10/2003 | Cummings et al. |
| 6,631,998 B2 | 10/2003 | Egawa et al. |
| 6,632,698 B2 | 10/2003 | Ives |
| 6,635,919 B1 | 10/2003 | Melendez et al. |
| 6,636,322 B1 | 10/2003 | Terashita |
| 6,642,913 B1 * | 11/2003 | Kimura et al. ................ 345/84 |
| 6,643,069 B2 | 11/2003 | Dewald |
| 6,650,455 B2 | 11/2003 | Miles |
| 6,653,997 B2 | 11/2003 | Van Gorkom et al. |
| 6,657,832 B2 | 12/2003 | Williams et al. |
| 6,660,656 B2 | 12/2003 | Cheung et al. |
| 6,661,561 B2 | 12/2003 | Fitzpatrick et al. |
| 6,666,561 B1 | 12/2003 | Blakley |
| 6,674,033 B1 | 1/2004 | Wang |
| 6,674,090 B1 | 1/2004 | Chua et al. |
| 6,674,562 B1 | 1/2004 | Miles |
| 6,674,563 B2 | 1/2004 | Chui et al. |
| 6,680,792 B2 | 1/2004 | Miles |
| 6,698,295 B1 | 3/2004 | Sherrer |
| 6,707,594 B2 | 3/2004 | Holmes |
| 6,710,908 B2 | 3/2004 | Miles et al. |
| 6,738,194 B1 | 5/2004 | Ramirez et al. |
| 6,741,377 B2 | 5/2004 | Miles |
| 6,741,383 B2 | 5/2004 | Huibers et al. |
| 6,741,384 B1 | 5/2004 | Martin et al. |
| 6,741,503 B1 | 5/2004 | Farris et al. |
| 6,742,907 B2 | 6/2004 | Funamoto et al. |
| 6,747,785 B2 | 6/2004 | Chen et al. |
| 6,747,800 B1 | 6/2004 | Lin |
| 6,750,876 B1 | 6/2004 | Atsatt et al. |
| 6,762,873 B1 | 7/2004 | Coker et al. |
| 6,768,555 B2 | 7/2004 | Chen et al. |
| 6,773,126 B1 | 8/2004 | Hatjasalo et al. |
| 6,775,174 B2 | 8/2004 | Huffman et al. |
| 6,778,155 B2 | 8/2004 | Doherty et al. |
| 6,778,746 B2 | 8/2004 | Charlton et al. |
| 6,781,643 B1 | 8/2004 | Watanabe et al. |
| 6,782,240 B1 | 8/2004 | Tabe |
| 6,787,384 B2 | 9/2004 | Okumura |
| 6,787,438 B1 | 9/2004 | Nelson |
| 6,788,520 B1 | 9/2004 | Behin et al. |
| 6,791,441 B2 | 9/2004 | Pillans et al. |
| 6,794,119 B2 | 9/2004 | Miles |
| 6,809,788 B2 | 10/2004 | Yamada et al. |
| 6,811,267 B1 | 11/2004 | Allen et al. |
| 6,813,059 B2 | 11/2004 | Hunter et al. |
| 6,813,060 B1 | 11/2004 | Garcia et al. |
| 6,819,469 B1 | 11/2004 | Koba |

(56) References Cited

U.S. PATENT DOCUMENTS

| | | |
|---|---|---|
| 6,822,628 B2 | 11/2004 | Dunphy et al. |
| 6,822,780 B1 | 11/2004 | Long, Jr. |
| 6,829,132 B2 | 12/2004 | Martin et al. |
| 6,836,366 B1 | 12/2004 | Flanders et al. |
| 6,841,081 B2 | 1/2005 | Chang et al. |
| 6,841,787 B2 | 1/2005 | Almogy |
| 6,844,959 B2 | 1/2005 | Huibers et al. |
| 6,849,471 B2 | 2/2005 | Patel et al. |
| 6,853,129 B1 | 2/2005 | Cummings et al. |
| 6,855,610 B2 | 2/2005 | Tung et al. |
| 6,859,218 B1 | 2/2005 | Luman et al. |
| 6,861,277 B1 | 3/2005 | Monroe et al. |
| 6,862,022 B2 | 3/2005 | Slupe |
| 6,862,029 B1 | 3/2005 | D'Souza et al. |
| 6,862,127 B1 | 3/2005 | Ishii |
| 6,864,882 B2 | 3/2005 | Newton |
| 6,867,896 B2 | 3/2005 | Miles |
| 6,870,581 B2 | 3/2005 | Li et al. |
| 6,870,654 B2 | 3/2005 | Lin et al. |
| 6,871,982 B2 | 3/2005 | Holman et al. |
| 6,879,354 B1 | 4/2005 | Sawayama et al. |
| 6,882,458 B2 | 4/2005 | Lin et al. |
| 6,882,461 B1 | 4/2005 | Tsai et al. |
| 6,891,658 B2 | 5/2005 | Whitehead et al. |
| 6,894,824 B2 | 5/2005 | Guo et al. |
| 6,897,855 B1 | 5/2005 | Matthies et al. |
| 6,903,860 B2 | 6/2005 | Ishii |
| 6,906,847 B2 | 6/2005 | Huibers et al. |
| 6,912,022 B2 | 6/2005 | Lin et al. |
| 6,913,942 B2 | 7/2005 | Patel et al. |
| 6,917,459 B2 | 7/2005 | Nikkel et al. |
| 6,930,816 B2 | 8/2005 | Mochizuki |
| 6,940,630 B2 | 9/2005 | Xie |
| 6,940,631 B2 | 9/2005 | Ishikawa |
| 6,947,200 B2 | 9/2005 | Huibers |
| 6,952,303 B2 | 10/2005 | Lin et al. |
| 6,958,847 B2 | 10/2005 | Lin |
| 6,959,990 B2 | 11/2005 | Penn |
| 6,960,305 B2 | 11/2005 | Doan et al. |
| 6,967,779 B2 | 11/2005 | Fadel et al. |
| 6,970,031 B1 | 11/2005 | Martin et al. |
| 6,980,350 B2 | 12/2005 | Hung et al. |
| 6,982,820 B2 | 1/2006 | Tsai |
| 6,995,890 B2 | 2/2006 | Lin |
| 6,999,225 B2 | 2/2006 | Lin et al. |
| 6,999,236 B2 | 2/2006 | Lin et al. |
| 7,002,726 B2 | 2/2006 | Patel et al. |
| 7,006,272 B2 | 2/2006 | Tsai |
| 7,008,812 B1 | 3/2006 | Carley |
| 7,009,754 B2 | 3/2006 | Huibers |
| 7,012,732 B2 | 3/2006 | Miles |
| 7,016,095 B2 | 3/2006 | Lin |
| 7,027,204 B2 | 4/2006 | Trisnadi et al. |
| 7,034,981 B2 | 4/2006 | Makigaki |
| 7,038,752 B2 | 5/2006 | Lin |
| 7,046,422 B2 | 5/2006 | Kimura et al. |
| 7,049,164 B2 | 5/2006 | Bruner |
| 7,050,219 B2 | 5/2006 | Kimura |
| 7,053,737 B2 | 5/2006 | Schwartz et al. |
| 7,061,681 B2 | 6/2006 | Anderson et al. |
| 7,072,093 B2 | 7/2006 | Piehl et al. |
| 7,072,096 B2 | 7/2006 | Holman et al. |
| 7,075,700 B2 | 7/2006 | Muenter |
| 7,078,293 B2 | 7/2006 | Lin et al. |
| 7,088,566 B2 | 8/2006 | Martin et al. |
| 7,095,545 B2 | 8/2006 | Regan |
| 7,113,339 B2 | 9/2006 | Taguchi et al. |
| 7,119,945 B2 | 10/2006 | Kothari et al. |
| 7,123,216 B1 | 10/2006 | Miles |
| 7,126,738 B2 | 10/2006 | Miles |
| 7,126,741 B2 | 10/2006 | Wagner et al. |
| 7,130,104 B2 | 10/2006 | Cummings |
| 7,138,984 B1 | 11/2006 | Miles |
| 7,139,112 B2 | 11/2006 | Whitehead, Jr. et al. |
| 7,142,346 B2 | 11/2006 | Chui et al. |
| 7,142,347 B2 | 11/2006 | Islam |
| 7,161,728 B2 | 1/2007 | Sampsell et al. |
| 7,161,730 B2 | 1/2007 | Floyd |
| 7,164,520 B2 | 1/2007 | Palmateer et al. |
| 7,172,915 B2 | 2/2007 | Lin et al. |
| 7,184,195 B2 | 2/2007 | Yang |
| 7,184,202 B2 | 2/2007 | Miles et al. |
| 7,187,489 B2 | 3/2007 | Miles |
| 7,196,837 B2 | 3/2007 | Sampsell et al. |
| 7,198,873 B2 | 4/2007 | Geh et al. |
| 7,198,973 B2 | 4/2007 | Lin et al. |
| 7,218,429 B2 | 5/2007 | Batchko |
| 7,218,499 B2 | 5/2007 | Martin et al. |
| 7,221,495 B2 | 5/2007 | Miles et al. |
| 7,236,284 B2 | 6/2007 | Miles |
| 7,242,512 B2 | 7/2007 | Chui et al. |
| 7,245,285 B2 | 7/2007 | Yeh et al. |
| 7,250,315 B2 | 7/2007 | Miles |
| 7,250,930 B2 | 7/2007 | Hoffman et al. |
| 7,256,922 B2 | 8/2007 | Chui et al. |
| 7,289,259 B2 | 10/2007 | Chui et al. |
| 7,291,921 B2 | 11/2007 | Lin |
| 7,297,471 B1 | 11/2007 | Miles |
| 7,301,704 B2 | 11/2007 | Miles |
| 7,302,157 B2 | 11/2007 | Chui |
| 7,304,784 B2 | 12/2007 | Chui et al. |
| 7,310,121 B2 | 12/2007 | Hirakata et al. |
| 7,310,179 B2 | 12/2007 | Chui et al. |
| 7,321,456 B2 | 1/2008 | Cummings |
| 7,321,457 B2 | 1/2008 | Heald |
| 7,323,217 B2 | 1/2008 | Lin et al. |
| 7,327,510 B2 | 2/2008 | Cummings et al. |
| 7,342,705 B2 | 3/2008 | Chui et al. |
| 7,342,709 B2 | 3/2008 | Lin |
| 7,345,805 B2 | 3/2008 | Chui |
| 7,349,139 B2 | 3/2008 | Chui et al. |
| 7,349,141 B2 | 3/2008 | Tung et al. |
| 7,355,780 B2 | 4/2008 | Chui et al. |
| 7,355,782 B2 | 4/2008 | Miles |
| 7,369,292 B2 | 5/2008 | Xu et al. |
| 7,369,294 B2 | 5/2008 | Gally et al. |
| 7,372,613 B2 | 5/2008 | Chui et al. |
| 7,372,619 B2 | 5/2008 | Miles |
| 7,375,465 B2 | 5/2008 | Chen |
| 7,379,227 B2 | 5/2008 | Miles |
| 7,382,515 B2 | 6/2008 | Chung et al. |
| 7,385,748 B2 | 6/2008 | Miles |
| 7,385,762 B2 | 6/2008 | Cummings |
| 7,388,697 B2 | 6/2008 | Chui et al. |
| 7,388,706 B2 | 6/2008 | Miles |
| 7,389,476 B2 | 6/2008 | Senda et al. |
| RE40,436 E | 7/2008 | Kothari et al. |
| 7,400,439 B2 | 7/2008 | Holman |
| 7,400,489 B2 | 7/2008 | Van Brocklin et al. |
| 7,403,180 B1 | 7/2008 | Silverstein et al. |
| 7,405,852 B2 | 7/2008 | Hagood et al. |
| 7,405,863 B2 | 7/2008 | Tung et al. |
| 7,417,735 B2 | 8/2008 | Cummings et al. |
| 7,417,746 B2 | 8/2008 | Lin et al. |
| 7,417,784 B2 | 8/2008 | Sasagawa et al. |
| 7,420,725 B2 | 9/2008 | Kothari |
| 7,436,573 B2 | 10/2008 | Doan et al. |
| 7,439,943 B2 | 10/2008 | Nakanishi |
| 7,450,295 B2 | 11/2008 | Tung et al. |
| 7,459,402 B2 | 12/2008 | Doan et al. |
| 7,460,291 B2 | 12/2008 | Sampsell et al. |
| 7,460,292 B2 | 12/2008 | Chou |
| 7,463,421 B2 | 12/2008 | Miles |
| 7,471,444 B2 | 12/2008 | Miles |
| 7,476,327 B2 | 1/2009 | Tung et al. |
| 7,477,440 B1 | 1/2009 | Huang |
| 7,483,197 B2 | 1/2009 | Miles |
| 7,486,429 B2 | 2/2009 | Chui |
| 7,486,867 B2 | 2/2009 | Wang |
| 7,489,428 B2 | 2/2009 | Sampsell et al. |
| 7,492,503 B2 | 2/2009 | Chui |
| 7,508,566 B2 | 3/2009 | Feenstra et al. |
| 7,508,571 B2 | 3/2009 | Gally et al. |
| 7,511,875 B2 | 3/2009 | Miles |

(56) References Cited

U.S. PATENT DOCUMENTS

| | | | |
|---|---|---|---|
| 7,513,327 B1 | 4/2009 | Peterson |
| 7,520,642 B2 | 4/2009 | Holman et al. |
| 7,527,995 B2 | 5/2009 | Sampsell |
| 7,527,996 B2 | 5/2009 | Luo et al. |
| 7,527,998 B2 | 5/2009 | Tung et al. |
| 7,532,377 B2 | 5/2009 | Miles |
| 7,532,381 B2 | 5/2009 | Miles et al. |
| 7,532,386 B2 | 5/2009 | Cummings et al. |
| 7,534,640 B2 | 5/2009 | Sasagawa et al. |
| 7,535,466 B2 | 5/2009 | Sampsell et al. |
| 7,535,621 B2 | 5/2009 | Chiang |
| 7,542,198 B2 | 6/2009 | Kothari |
| 7,545,554 B2 | 6/2009 | Chui et al. |
| 7,547,565 B2 | 6/2009 | Lin |
| 7,550,794 B2 | 6/2009 | Miles et al. |
| 7,550,810 B2 | 6/2009 | Mignard et al. |
| 7,554,711 B2 | 6/2009 | Miles |
| 7,554,714 B2 | 6/2009 | Chui et al. |
| 7,556,917 B2 | 7/2009 | Miles |
| 7,561,321 B2 | 7/2009 | Heald |
| 7,561,323 B2 | 7/2009 | Gally et al. |
| 7,564,612 B2 | 7/2009 | Chui |
| 7,564,613 B2 | 7/2009 | Sasagawa et al. |
| 7,566,664 B2 | 7/2009 | Yan et al. |
| 7,566,940 B2 | 7/2009 | Sasagawa et al. |
| 7,569,488 B2 | 8/2009 | Rafanan |
| 7,576,901 B2 | 8/2009 | Chui et al. |
| 7,580,175 B2 | 8/2009 | Aksyuk et al. |
| 7,583,350 B2 | 9/2009 | Chang et al. |
| 7,586,484 B2 | 9/2009 | Sampsell et al. |
| 7,595,926 B2 | 9/2009 | Sasagawa et al. |
| 7,601,571 B2 | 10/2009 | Chui et al. |
| 7,602,375 B2 | 10/2009 | Chui et al. |
| 7,603,001 B2 | 10/2009 | Wang et al. |
| 7,605,969 B2 | 10/2009 | Miles |
| 7,612,932 B2 | 11/2009 | Chui et al. |
| 7,619,810 B2 | 11/2009 | Miles |
| 7,623,287 B2 | 11/2009 | Sasagawa et al. |
| 7,626,581 B2 | 12/2009 | Chui et al. |
| 7,630,119 B2 | 12/2009 | Tung et al. |
| 7,630,121 B2 | 12/2009 | Endisch et al. |
| 7,630,123 B2 | 12/2009 | Kothari |
| 7,642,110 B2 | 1/2010 | Miles |
| 7,643,203 B2 | 1/2010 | Gousev et al. |
| 7,643,305 B2 | 1/2010 | Lin |
| 7,646,529 B2 | 1/2010 | Chui |
| 7,649,671 B2 | 1/2010 | Kothari et al. |
| 7,652,814 B2 | 1/2010 | Zhong et al. |
| 7,653,371 B2 | 1/2010 | Floyd |
| 7,656,391 B2 | 2/2010 | Kimura et al. |
| 7,660,031 B2 | 2/2010 | Floyd |
| 7,660,058 B2 | 2/2010 | Qiu et al. |
| 7,663,794 B2 | 2/2010 | Cummings |
| 7,672,035 B2 | 3/2010 | Sampsell et al. |
| 7,679,627 B2 | 3/2010 | Sampsell et al. |
| 7,679,812 B2 | 3/2010 | Sasagawa et al. |
| 7,692,844 B2 | 4/2010 | Miles |
| 7,704,772 B2 | 4/2010 | Tung et al. |
| 7,704,773 B2 | 4/2010 | Kogut et al. |
| 7,706,050 B2 | 4/2010 | Sampsell |
| 7,710,632 B2 | 5/2010 | Cummings |
| 7,710,636 B2 | 5/2010 | Chui |
| 7,711,239 B2 | 5/2010 | Sasagawa et al. |
| 7,719,500 B2 | 5/2010 | Chui |
| 7,719,747 B2 | 5/2010 | Tung et al. |
| 7,719,754 B2 | 5/2010 | Patel et al. |
| 7,723,015 B2 | 5/2010 | Miles |
| 7,733,439 B2 | 6/2010 | Sampsell et al. |
| 7,733,552 B2 | 6/2010 | Londergan et al. |
| 7,738,157 B2 | 6/2010 | Miles |
| 7,747,109 B2 | 6/2010 | Zhong et al. |
| 7,750,886 B2 | 7/2010 | Sampsell |
| 7,766,498 B2 | 8/2010 | Sampsell |
| 7,768,690 B2 | 8/2010 | Sampsell |
| 7,776,631 B2 | 8/2010 | Miles |
| 7,777,954 B2 | 8/2010 | Gruhike et al. |
| 7,781,850 B2 | 8/2010 | Miles et al. |
| 7,782,522 B2 | 8/2010 | Lan |
| 7,782,525 B2 | 8/2010 | Sampsell et al. |
| 7,787,173 B2 | 8/2010 | Chui |
| 7,791,787 B2 | 9/2010 | Miles |
| 7,800,809 B2 | 9/2010 | Miles |
| 7,807,488 B2 | 10/2010 | Gally et al. |
| 7,808,694 B2 | 10/2010 | Miles |
| 7,826,120 B2 | 11/2010 | Miles |
| 7,830,586 B2 | 11/2010 | Miles |
| 7,830,587 B2 | 11/2010 | Miles |
| 7,830,588 B2 | 11/2010 | Miles |
| 7,830,589 B2 | 11/2010 | Floyd |
| 7,835,093 B2 | 11/2010 | Wang |
| 7,839,556 B2 | 11/2010 | Miles |
| 7,839,557 B2 | 11/2010 | Chui et al. |
| 7,839,559 B2 | 11/2010 | Miles |
| 7,846,344 B2 | 12/2010 | Miles |
| 7,848,001 B2 | 12/2010 | Miles |
| 7,848,004 B2 | 12/2010 | Miles |
| 7,852,544 B2 | 12/2010 | Sampsell et al. |
| 7,852,545 B2 | 12/2010 | Miles |
| 7,855,824 B2 | 12/2010 | Gally |
| 7,864,402 B2 | 1/2011 | Chui et al. |
| 7,872,792 B2 | 1/2011 | Miles |
| 7,875,485 B2 | 1/2011 | Sasagawa et al. |
| RE42,119 E | 2/2011 | Chui et al. |
| 7,880,954 B2 | 2/2011 | Sampsell |
| 7,884,989 B2 | 2/2011 | Gally et al. |
| 7,889,415 B2 | 2/2011 | Kothari |
| 7,893,919 B2 | 2/2011 | Kothari et al. |
| 7,898,521 B2 | 3/2011 | Gally et al. |
| 7,898,722 B2 | 3/2011 | Miles |
| 7,898,723 B2 | 3/2011 | Khazeni et al. |
| 7,903,316 B2 | 3/2011 | Kothari et al. |
| 7,907,319 B2 | 3/2011 | Miles |
| 7,916,980 B2 | 3/2011 | Lasiter |
| 7,920,135 B2 | 4/2011 | Sampsell et al. |
| 7,924,494 B2 | 4/2011 | Tung et al. |
| 7,929,197 B2 | 4/2011 | Miles |
| 7,933,475 B2 | 4/2011 | Wang et al. |
| 7,936,031 B2 | 5/2011 | Sampsell et al. |
| 7,944,599 B2 | 5/2011 | Chui et al. |
| 7,944,603 B2 | 5/2011 | Sasagawa et al. |
| 7,948,671 B2 | 5/2011 | Tung et al. |
| 7,982,700 B2 | 7/2011 | Chui et al. |
| 7,999,993 B2 | 8/2011 | Chui et al. |
| 8,004,504 B2 | 8/2011 | Cummings et al. |
| 8,008,736 B2 | 8/2011 | Kothari |
| 8,009,347 B2 | 8/2011 | Chui et al. |
| 8,014,059 B2 | 9/2011 | Miles |
| 8,023,167 B2 | 9/2011 | Sampsell |
| 8,035,884 B2 | 10/2011 | Miles |
| 8,054,532 B2 | 11/2011 | Miles |
| 8,058,549 B2 | 11/2011 | Kothari et al. |
| 8,059,326 B2 | 11/2011 | Miles |
| 8,064,124 B2 | 11/2011 | Chung et al. |
| 8,068,710 B2 | 11/2011 | Bita et al. |
| 8,081,369 B2 | 12/2011 | Miles |
| 8,081,370 B2 | 12/2011 | Sampsell |
| 8,081,373 B2 | 12/2011 | Kothari et al. |
| 8,098,416 B2 | 1/2012 | Kothari et al. |
| 8,105,496 B2 | 1/2012 | Miles |
| 8,115,988 B2 | 2/2012 | Chui et al. |
| 8,120,125 B2 | 2/2012 | Sasagawa et al. |
| 8,124,434 B2 | 2/2012 | Gally et al. |
| 8,149,497 B2 | 4/2012 | Sasagawa et al. |
| 8,213,075 B2 | 7/2012 | Chui et al. |
| 8,218,229 B2 | 7/2012 | Sasagawa et al. |
| 8,229,253 B2 | 7/2012 | Zhong et al. |
| 8,264,763 B2 | 9/2012 | Miles |
| 8,278,726 B2 | 10/2012 | Miles et al. |
| 8,284,474 B2 | 10/2012 | Miles |
| 8,289,613 B2 | 10/2012 | Chui et al. |
| 8,298,847 B2 | 10/2012 | Kogut et al. |
| 8,344,470 B2 | 1/2013 | Sampsell et al. |
| 8,368,124 B2 | 2/2013 | Miles et al. |
| 8,416,487 B2 | 4/2013 | Miles |

(56) References Cited

U.S. PATENT DOCUMENTS

| | | |
|---|---|---|
| 8,422,108 B2 | 4/2013 | Miles |
| 2001/0003487 A1 | 6/2001 | Miles |
| 2001/0019479 A1 | 9/2001 | Nakabayashi et al. |
| 2001/0022636 A1 | 9/2001 | Yang et al. |
| 2001/0028503 A1 | 10/2001 | Flanders et al. |
| 2001/0030861 A1 | 10/2001 | Oda et al. |
| 2001/0034075 A1 | 10/2001 | Onoya |
| 2001/0046081 A1 | 11/2001 | Hayashi et al. |
| 2001/0049061 A1 | 12/2001 | Nakagaki et al. |
| 2001/0050666 A1 | 12/2001 | Huang et al. |
| 2001/0051014 A1 | 12/2001 | Behin et al. |
| 2001/0055208 A1 | 12/2001 | Kimura |
| 2002/0005827 A1 | 1/2002 | Kobayashi |
| 2002/0014579 A1 | 2/2002 | Dunfield |
| 2002/0027636 A1 | 3/2002 | Yamada |
| 2002/0036304 A1 | 3/2002 | Ehmke et al. |
| 2002/0041264 A1 | 4/2002 | Quanrud |
| 2002/0050286 A1 | 5/2002 | Kubota |
| 2002/0050882 A1 | 5/2002 | Hyman et al. |
| 2002/0051281 A1 | 5/2002 | Ueda et al. |
| 2002/0054424 A1 | 5/2002 | Miles |
| 2002/0075226 A1 | 6/2002 | Lippincott |
| 2002/0075555 A1 | 6/2002 | Miles |
| 2002/0093722 A1 | 7/2002 | Chan et al. |
| 2002/0097133 A1 | 7/2002 | Charvet et al. |
| 2002/0114558 A1 | 8/2002 | Nemirovsky |
| 2002/0126364 A1 | 9/2002 | Miles |
| 2002/0139981 A1 | 10/2002 | Young |
| 2002/0146200 A1 | 10/2002 | Kudrle et al. |
| 2002/0149828 A1 | 10/2002 | Miles |
| 2002/0149834 A1 | 10/2002 | Mei et al. |
| 2002/0149850 A1 | 10/2002 | Heffner et al. |
| 2002/0154215 A1 | 10/2002 | Schechterman et al. |
| 2002/0154422 A1 | 10/2002 | Sniegowski et al. |
| 2002/0167072 A1 | 11/2002 | Andosca |
| 2002/0167730 A1 | 11/2002 | Needham et al. |
| 2002/0171610 A1 | 11/2002 | Siwinski et al. |
| 2002/0175284 A1 | 11/2002 | Vilain |
| 2002/0181208 A1 | 12/2002 | Credelle et al. |
| 2002/0186108 A1 | 12/2002 | Hallbjorner |
| 2002/0186209 A1 | 12/2002 | Cok |
| 2002/0186483 A1 | 12/2002 | Hagelin et al. |
| 2002/0197761 A1 | 12/2002 | Patel et al. |
| 2003/0002124 A1 | 1/2003 | Green et al. |
| 2003/0004272 A1 | 1/2003 | Power |
| 2003/0011864 A1 | 1/2003 | Flanders |
| 2003/0015936 A1 | 1/2003 | Yoon et al. |
| 2003/0016428 A1 | 1/2003 | Kato et al. |
| 2003/0029705 A1 | 2/2003 | Qiu et al. |
| 2003/0035196 A1 | 2/2003 | Walker |
| 2003/0043157 A1 | 3/2003 | Miles |
| 2003/0053078 A1 | 3/2003 | Missey et al. |
| 2003/0072020 A1 | 4/2003 | Mitsudomi et al. |
| 2003/0083429 A1 | 5/2003 | Smith et al. |
| 2003/0107692 A1 | 6/2003 | Sekiguchi |
| 2003/0107805 A1 | 6/2003 | Street |
| 2003/0112507 A1 | 6/2003 | Divelbiss et al. |
| 2003/0119221 A1 | 6/2003 | Cunningham et al. |
| 2003/0122773 A1 | 7/2003 | Washio et al. |
| 2003/0123125 A1 | 7/2003 | Little |
| 2003/0123245 A1 | 7/2003 | Parker et al. |
| 2003/0128197 A1 | 7/2003 | Turner et al. |
| 2003/0137215 A1 | 7/2003 | Cabuz |
| 2003/0137521 A1 | 7/2003 | Zehner et al. |
| 2003/0138669 A1 | 7/2003 | Kojima et al. |
| 2003/0141453 A1 | 7/2003 | Reed et al. |
| 2003/0151821 A1 | 8/2003 | Favalora et al. |
| 2003/0156315 A1 | 8/2003 | Li et al. |
| 2003/0160919 A1 | 8/2003 | Suzuki et al. |
| 2003/0173504 A1 | 9/2003 | Cole et al. |
| 2003/0189528 A1 | 10/2003 | Antila et al. |
| 2003/0189536 A1 | 10/2003 | Ruigt |
| 2003/0202264 A1 | 10/2003 | Weber et al. |
| 2003/0202265 A1 | 10/2003 | Reboa et al. |
| 2003/0202266 A1 | 10/2003 | Ring et al. |
| 2003/0210363 A1 | 11/2003 | Yasukawa et al. |
| 2003/0210851 A1 | 11/2003 | Fu et al. |
| 2003/0214621 A1 | 11/2003 | Kim et al. |
| 2004/0008396 A1 | 1/2004 | Stappaerts |
| 2004/0008438 A1 | 1/2004 | Sato |
| 2004/0022044 A1 | 2/2004 | Yasuoka et al. |
| 2004/0027671 A1 | 2/2004 | Wu et al. |
| 2004/0027701 A1 | 2/2004 | Ishikawa |
| 2004/0043552 A1 | 3/2004 | Strumpell et al. |
| 2004/0046920 A1 | 3/2004 | Hayata et al. |
| 2004/0051929 A1* | 3/2004 | Sampsell et al. ............... 359/247 |
| 2004/0056742 A1 | 3/2004 | Dabbaj |
| 2004/0066477 A1 | 4/2004 | Morimoto et al. |
| 2004/0070711 A1 | 4/2004 | Wen et al. |
| 2004/0075967 A1 | 4/2004 | Lynch et al. |
| 2004/0076802 A1 | 4/2004 | Tompkin et al. |
| 2004/0080035 A1 | 4/2004 | Delapierre |
| 2004/0100594 A1 | 5/2004 | Huibers et al. |
| 2004/0115339 A1 | 6/2004 | Ito |
| 2004/0124483 A1 | 7/2004 | Partridge et al. |
| 2004/0125048 A1 | 7/2004 | Fukuda et al. |
| 2004/0125347 A1 | 7/2004 | Patel et al. |
| 2004/0136045 A1 | 7/2004 | Tran |
| 2004/0140557 A1 | 7/2004 | Sun et al. |
| 2004/0145049 A1 | 7/2004 | McKinnell et al. |
| 2004/0147056 A1 | 7/2004 | McKinnell et al. |
| 2004/0148009 A1 | 7/2004 | Buzzard et al. |
| 2004/0150939 A1 | 8/2004 | Huff |
| 2004/0160143 A1 | 8/2004 | Shreeve et al. |
| 2004/0174583 A1 | 9/2004 | Chen et al. |
| 2004/0175577 A1 | 9/2004 | Lin et al. |
| 2004/0179281 A1 | 9/2004 | Reboa |
| 2004/0179445 A1 | 9/2004 | Park et al. |
| 2004/0184766 A1 | 9/2004 | Kim et al. |
| 2004/0188599 A1 | 9/2004 | Viktorovitch et al. |
| 2004/0201908 A1 | 10/2004 | Kaneko |
| 2004/0209195 A1 | 10/2004 | Lin |
| 2004/0212026 A1 | 10/2004 | Van et al. |
| 2004/0217264 A1 | 11/2004 | Wood et al. |
| 2004/0217378 A1 | 11/2004 | Martin et al. |
| 2004/0217919 A1 | 11/2004 | Piehl et al. |
| 2004/0218334 A1 | 11/2004 | Martin et al. |
| 2004/0223204 A1 | 11/2004 | Mao et al. |
| 2004/0233503 A1 | 11/2004 | Kimura |
| 2004/0259010 A1 | 12/2004 | Kanbe |
| 2005/0001797 A1 | 1/2005 | Miller et al. |
| 2005/0001828 A1 | 1/2005 | Martin et al. |
| 2005/0002082 A1 | 1/2005 | Miles |
| 2005/0012577 A1 | 1/2005 | Pillans et al. |
| 2005/0014374 A1 | 1/2005 | Partridge et al. |
| 2005/0017177 A1 | 1/2005 | Tai et al. |
| 2005/0017942 A1 | 1/2005 | Tsujino et al. |
| 2005/0035699 A1 | 2/2005 | Tsai |
| 2005/0036095 A1 | 2/2005 | Yeh et al. |
| 2005/0038950 A1 | 2/2005 | Adelmann |
| 2005/0042117 A1 | 2/2005 | Lin |
| 2005/0046922 A1 | 3/2005 | Lin et al. |
| 2005/0046948 A1 | 3/2005 | Lin |
| 2005/0054135 A1 | 3/2005 | Patel et al. |
| 2005/0057442 A1 | 3/2005 | Way |
| 2005/0068583 A1 | 3/2005 | Gutkowski et al. |
| 2005/0068627 A1 | 3/2005 | Nakamura et al. |
| 2005/0069209 A1 | 3/2005 | Damera-Venkata et al. |
| 2005/0116924 A1 | 6/2005 | Sauvante et al. |
| 2005/0117190 A1 | 6/2005 | Iwauchi et al. |
| 2005/0117623 A1 | 6/2005 | Shchukin et al. |
| 2005/0122306 A1 | 6/2005 | Wilcox et al. |
| 2005/0128543 A1 | 6/2005 | Phillips et al. |
| 2005/0133761 A1 | 6/2005 | Thielemans |
| 2005/0168431 A1* | 8/2005 | Chui ............................. 345/100 |
| 2005/0179378 A1 | 8/2005 | Oooka et al. |
| 2005/0195462 A1 | 9/2005 | Lin |
| 2005/0239275 A1 | 10/2005 | Muthukumar et al. |
| 2005/0253820 A1 | 11/2005 | Horiuchi |
| 2005/0259302 A9 | 11/2005 | Metz et al. |
| 2005/0275930 A1 | 12/2005 | Patel et al. |
| 2006/0002141 A1 | 1/2006 | Ouderkirk et al. |
| 2006/0007517 A1 | 1/2006 | Tsai |
| 2006/0017379 A1 | 1/2006 | Su et al. |

(56) References Cited

U.S. PATENT DOCUMENTS

| | | |
|---|---|---|
| 2006/0017689 A1 | 1/2006 | Faase et al. |
| 2006/0022966 A1 | 2/2006 | Mar |
| 2006/0024017 A1 | 2/2006 | Page et al. |
| 2006/0024880 A1 | 2/2006 | Chui et al. |
| 2006/0038643 A1 | 2/2006 | Xu et al. |
| 2006/0044246 A1 | 3/2006 | Mignard |
| 2006/0044298 A1 | 3/2006 | Mignard et al. |
| 2006/0044654 A1 | 3/2006 | Vandorpe et al. |
| 2006/0044928 A1 | 3/2006 | Chui et al. |
| 2006/0056000 A1 | 3/2006 | Mignard |
| 2006/0057754 A1 | 3/2006 | Cummings |
| 2006/0066541 A1 | 3/2006 | Gally et al. |
| 2006/0066542 A1 | 3/2006 | Chui |
| 2006/0066557 A1 | 3/2006 | Floyd |
| 2006/0066560 A1 | 3/2006 | Gally et al. |
| 2006/0066561 A1 | 3/2006 | Chui et al. |
| 2006/0066586 A1 | 3/2006 | Gally et al. |
| 2006/0066594 A1 | 3/2006 | Tyger |
| 2006/0066596 A1 | 3/2006 | Sampsell et al. |
| 2006/0066597 A1 | 3/2006 | Sampsell |
| 2006/0066598 A1 | 3/2006 | Floyd |
| 2006/0066601 A1 | 3/2006 | Kothari et al. |
| 2006/0066641 A1 | 3/2006 | Gally et al. |
| 2006/0066937 A1 | 3/2006 | Chui |
| 2006/0067648 A1 | 3/2006 | Chui et al. |
| 2006/0067653 A1 | 3/2006 | Gally et al. |
| 2006/0077122 A1 | 4/2006 | Gally et al. |
| 2006/0077124 A1 | 4/2006 | Gally et al. |
| 2006/0077126 A1 | 4/2006 | Kothari |
| 2006/0077149 A1 | 4/2006 | Gally et al. |
| 2006/0077156 A1 | 4/2006 | Chui et al. |
| 2006/0077514 A1 | 4/2006 | Sampsell |
| 2006/0077528 A1* | 4/2006 | Floyd ............... 359/291 |
| 2006/0082588 A1 | 4/2006 | Mizuno et al. |
| 2006/0082863 A1 | 4/2006 | Piehl et al. |
| 2006/0091824 A1 | 5/2006 | Pate et al. |
| 2006/0103912 A1 | 5/2006 | Katoh et al. |
| 2006/0132383 A1 | 6/2006 | Gally et al. |
| 2006/0132927 A1 | 6/2006 | Yoon |
| 2006/0176241 A1 | 8/2006 | Sampsell |
| 2006/0180886 A1 | 8/2006 | Tsang |
| 2006/0220160 A1 | 10/2006 | Miles |
| 2006/0265919 A1 | 11/2006 | Huang |
| 2006/0274460 A1 | 12/2006 | Zuercher et al. |
| 2007/0020948 A1 | 1/2007 | Piehl et al. |
| 2007/0077514 A1 | 4/2007 | Sawabe et al. |
| 2007/0077525 A1 | 4/2007 | Davis et al. |
| 2007/0086078 A1 | 4/2007 | Hagood et al. |
| 2007/0092728 A1 | 4/2007 | Ouderkirk et al. |
| 2007/0097694 A1 | 5/2007 | Faase et al. |
| 2007/0138391 A1 | 6/2007 | Garber et al. |
| 2007/0138608 A1 | 6/2007 | Ikehashi |
| 2007/0153860 A1 | 7/2007 | Chang-Hasnain et al. |
| 2007/0190886 A1 | 8/2007 | Satoh et al. |
| 2007/0216987 A1 | 9/2007 | Hagood et al. |
| 2007/0229936 A1 | 10/2007 | Miles |
| 2007/0247704 A1 | 10/2007 | Mignard |
| 2007/0249078 A1 | 10/2007 | Tung et al. |
| 2007/0253034 A1 | 11/2007 | Watanabe et al. |
| 2008/0049450 A1 | 2/2008 | Sampsell |
| 2008/0055705 A1 | 3/2008 | Kothari |
| 2008/0068697 A1 | 3/2008 | Haluzak et al. |
| 2008/0084600 A1 | 4/2008 | Bita et al. |
| 2008/0084602 A1 | 4/2008 | Xu et al. |
| 2008/0100900 A1 | 5/2008 | Chui |
| 2008/0110855 A1 | 5/2008 | Cummings |
| 2008/0112039 A1 | 5/2008 | Chui et al. |
| 2008/0151347 A1 | 6/2008 | Chui et al. |
| 2008/0157413 A1 | 7/2008 | Lin |
| 2008/0158648 A1 | 7/2008 | Cummings |
| 2008/0191978 A1 | 8/2008 | Miles |
| 2008/0192029 A1 | 8/2008 | Anderson et al. |
| 2008/0297880 A1 | 12/2008 | Steckl et al. |
| 2009/0021884 A1 | 1/2009 | Nakamura |
| 2009/0059346 A1 | 3/2009 | Xu |
| 2009/0078316 A1 | 3/2009 | Khazeni et al. |
| 2009/0086301 A1 | 4/2009 | Gally et al. |
| 2009/0097100 A1 | 4/2009 | Gally et al. |
| 2009/0103161 A1 | 4/2009 | Kothari et al. |
| 2009/0103165 A1 | 4/2009 | Kothari et al. |
| 2009/0126792 A1 | 5/2009 | Gruhlke et al. |
| 2009/0147535 A1 | 6/2009 | Mienko et al. |
| 2009/0151771 A1 | 6/2009 | Kothari et al. |
| 2009/0159123 A1 | 6/2009 | Kothari et al. |
| 2009/0168459 A1 | 7/2009 | Holman et al. |
| 2009/0174651 A1 | 7/2009 | Jacobsen et al. |
| 2009/0211885 A1 | 8/2009 | Steeneken et al. |
| 2009/0225394 A1 | 9/2009 | Chui et al. |
| 2009/0242024 A1 | 10/2009 | Kothari et al. |
| 2009/0256218 A1 | 10/2009 | Mignard et al. |
| 2009/0267953 A1 | 10/2009 | Sampsell et al. |
| 2009/0279162 A1 | 11/2009 | Chui |
| 2009/0293955 A1 | 12/2009 | Kothari et al. |
| 2010/0096006 A1 | 4/2010 | Griffiths et al. |
| 2010/0096011 A1 | 4/2010 | Griffiths et al. |
| 2010/0134503 A1 | 6/2010 | Sampsell et al. |
| 2010/0165443 A1 | 7/2010 | Chui |
| 2010/0220248 A1 | 9/2010 | Miles |
| 2010/0236624 A1 | 9/2010 | Khazeni et al. |
| 2010/0245370 A1 | 9/2010 | Narayanan et al. |
| 2010/0245975 A1 | 9/2010 | Cummings |
| 2010/0284055 A1 | 11/2010 | Kothari et al. |
| 2010/0290102 A1 | 11/2010 | Lan |
| 2011/0019380 A1 | 1/2011 | Miles |
| 2011/0026096 A1 | 2/2011 | Miles |
| 2011/0043891 A1 | 2/2011 | Miles |
| 2011/0058243 A1 | 3/2011 | Wang |
| 2011/0080632 A1 | 4/2011 | Miles |
| 2011/0116156 A1 | 5/2011 | Kothari |
| 2011/0122479 A1 | 5/2011 | Sampsell |
| 2011/0148828 A1 | 6/2011 | Sampsell et al. |
| 2011/0157010 A1 | 6/2011 | Kothari et al. |
| 2011/0170166 A1 | 7/2011 | Miles |
| 2011/0170167 A1 | 7/2011 | Miles |
| 2011/0188110 A1 | 8/2011 | Miles |
| 2011/0199667 A1 | 8/2011 | Wang et al. |
| 2011/0260956 A1 | 10/2011 | Govil et al. |
| 2012/0044563 A1 | 2/2012 | Cummings et al. |
| 2012/0062310 A1 | 3/2012 | Miles |
| 2012/0085731 A1 | 4/2012 | Miles |
| 2012/0088027 A1 | 4/2012 | Kothari et al. |
| 2012/0099174 A1 | 4/2012 | Miles |
| 2012/0105385 A1 | 5/2012 | Sasagawa et al. |
| 2012/0127556 A1 | 5/2012 | Gally et al. |
| 2012/0134008 A1 | 5/2012 | Bita et al. |
| 2012/0139976 A1 | 6/2012 | Chui et al. |
| 2012/0162232 A1 | 6/2012 | He et al. |
| 2012/0182595 A1 | 7/2012 | Miles |
| 2012/0188215 A1 | 7/2012 | Bushankuchu |
| 2012/0194897 A1 | 8/2012 | Zhong et al. |
| 2012/0287138 A1 | 11/2012 | Zhong et al. |
| 2013/0069958 A1 | 3/2013 | Chui et al. |
| 2013/0249964 A1 | 9/2013 | Sampsell et al. |

FOREIGN PATENT DOCUMENTS

| | | |
|---|---|---|
| CN | 1213861 A | 4/1999 |
| DE | 3402746 | 8/1985 |
| DE | 4108966 A1 | 9/1992 |
| DE | 19622748 | 12/1997 |
| DE | 10228946 A1 | 1/2004 |
| EP | 0035299 A2 | 9/1981 |
| EP | 0112646 A2 | 7/1984 |
| EP | 0223136 A2 | 5/1987 |
| EP | 0261897 A2 | 3/1988 |
| EP | 0278038 A1 | 8/1988 |
| EP | 0295802 A1 | 12/1988 |
| EP | 0300754 A2 | 1/1989 |
| EP | 0306308 A2 | 3/1989 |
| EP | 0310176 A2 | 4/1989 |
| EP | 0318050 A2 | 5/1989 |
| EP | 0361981 A2 | 4/1990 |
| EP | 0417523 A2 | 3/1991 |
| EP | 0467048 A2 | 1/1992 |

(56) References Cited

FOREIGN PATENT DOCUMENTS

| | | |
|---|---|---|
| EP | 0539099 A2 | 4/1993 |
| EP | 0570906 A1 | 11/1993 |
| EP | 0582850 A1 | 2/1994 |
| EP | 583102 A1 | 2/1994 |
| EP | 0590511 A1 | 4/1994 |
| EP | 0608056 A1 | 7/1994 |
| EP | 0621500 A1 | 10/1994 |
| EP | 0622856 A1 | 11/1994 |
| EP | 0655725 A1 | 5/1995 |
| EP | 0667548 A1 | 8/1995 |
| EP | 0668490 A2 | 8/1995 |
| EP | 0695959 A1 | 2/1996 |
| EP | 0725380 A1 | 8/1996 |
| EP | 0786911 A2 | 7/1997 |
| EP | 0788005 A2 | 8/1997 |
| EP | 0822441 A2 | 2/1998 |
| EP | 0830032 A2 | 3/1998 |
| EP | 0843364 A1 | 5/1998 |
| EP | 0852371 A1 | 7/1998 |
| EP | 0855745 A2 | 7/1998 |
| EP | 0867747 A2 | 9/1998 |
| EP | 0879991 A2 | 11/1998 |
| EP | 0907050 A1 | 4/1999 |
| EP | 0911794 A1 | 4/1999 |
| EP | 0957392 A1 | 11/1999 |
| EP | 0969306 A1 | 1/2000 |
| EP | 0984314 A2 | 3/2000 |
| EP | 0986077 A2 | 3/2000 |
| EP | 1003062 A1 | 5/2000 |
| EP | 1014161 A1 | 6/2000 |
| EP | 1017038 A2 | 7/2000 |
| EP | 1067805 A2 | 1/2001 |
| EP | 1089115 A1 | 4/2001 |
| EP | 1122577 A2 | 8/2001 |
| EP | 1146533 A1 | 10/2001 |
| EP | 1205782 A2 | 5/2002 |
| EP | 1227346 A2 | 7/2002 |
| EP | 1251454 A2 | 10/2002 |
| EP | 1275997 A2 | 1/2003 |
| EP | 1336876 A1 | 8/2003 |
| EP | 1341025 A1 | 9/2003 |
| EP | 1343190 A2 | 9/2003 |
| EP | 1345197 A1 | 9/2003 |
| EP | 1381023 A2 | 1/2004 |
| EP | 1389775 A2 | 2/2004 |
| EP | 1403212 A2 | 3/2004 |
| EP | 1413543 A1 | 4/2004 |
| EP | 1435336 A2 | 7/2004 |
| EP | 1473581 A2 | 11/2004 |
| EP | 1473691 A2 | 11/2004 |
| EP | 1484635 A1 | 12/2004 |
| FR | 2824643 A1 | 11/2002 |
| GB | 2260203 A | 4/1993 |
| GB | 2278222 | 11/1994 |
| GB | 2315356 A | 1/1998 |
| GB | 2321532 A | 7/1998 |
| GB | 2331615 | 5/1999 |
| GB | 2401200 | 11/2004 |
| JP | 56010976 | 2/1981 |
| JP | 56010977 A | 2/1981 |
| JP | 56088111 | 7/1981 |
| JP | 59104184 A | 6/1984 |
| JP | 60147718 | 8/1985 |
| JP | 60242408 A | 12/1985 |
| JP | 61093678 A | 5/1986 |
| JP | 62009317 | 1/1987 |
| JP | 62082454 | 4/1987 |
| JP | 1102415 | 4/1989 |
| JP | 2003993 A | 1/1990 |
| JP | 2068513 A | 3/1990 |
| JP | 2132424 A | 5/1990 |
| JP | 02151079 | 6/1990 |
| JP | 2237172 A | 9/1990 |
| JP | 3030419 A | 2/1991 |
| JP | 3109524 | 5/1991 |
| JP | 03-180890 | 8/1991 |
| JP | 3199920 A | 8/1991 |
| JP | 04081816 | 3/1992 |
| JP | 4127580 A | 4/1992 |
| JP | 04190323 | 7/1992 |
| JP | 04238321 | 8/1992 |
| JP | 04-276721 | 10/1992 |
| JP | 04309925 | 11/1992 |
| JP | 05049238 | 2/1993 |
| JP | 5259495 A | 10/1993 |
| JP | 5275401 A | 10/1993 |
| JP | 05281479 | 10/1993 |
| JP | 6021494 A | 1/1994 |
| JP | 6209114 A | 7/1994 |
| JP | 06281956 | 10/1994 |
| JP | 06350105 | 12/1994 |
| JP | 07045550 | 2/1995 |
| JP | 07060844 | 3/1995 |
| JP | 07098326 | 4/1995 |
| JP | 07509327 | 10/1995 |
| JP | 8018990 A | 1/1996 |
| JP | 8051230 A | 2/1996 |
| JP | 08094992 | 4/1996 |
| JP | 09022012 | 1/1997 |
| JP | 09036387 | 2/1997 |
| JP | 09068722 | 3/1997 |
| JP | 9127439 | 5/1997 |
| JP | 09160032 | 6/1997 |
| JP | 9171111 A | 6/1997 |
| JP | 09189869 A | 7/1997 |
| JP | 09189910 A | 7/1997 |
| JP | 09507920 | 8/1997 |
| JP | 09260696 | 10/1997 |
| JP | 9275220 A | 10/1997 |
| JP | 09281917 | 10/1997 |
| JP | 09311333 | 12/1997 |
| JP | 10020328 | 1/1998 |
| JP | 10161630 | 6/1998 |
| JP | 10202948 | 8/1998 |
| JP | 10325953 A | 12/1998 |
| JP | 11174234 | 7/1999 |
| JP | 11211999 A | 8/1999 |
| JP | 11231321 A | 8/1999 |
| JP | 11232919 | 8/1999 |
| JP | 11249132 A | 9/1999 |
| JP | 11295725 | 10/1999 |
| JP | 11295726 A | 10/1999 |
| JP | 2000081848 | 3/2000 |
| JP | 2000147262 A | 5/2000 |
| JP | 2000514568 | 10/2000 |
| JP | 2000306515 A | 11/2000 |
| JP | 2001021883 | 1/2001 |
| JP | 2001221913 A | 8/2001 |
| JP | 2001249283 A | 9/2001 |
| JP | 2001343514 | 12/2001 |
| JP | 2002062490 A | 2/2002 |
| JP | 2002062505 A | 2/2002 |
| JP | 2002174780 | 6/2002 |
| JP | 2002175053 | 6/2002 |
| JP | 2002221678 A | 8/2002 |
| JP | 2002277771 A | 9/2002 |
| JP | 2002287047 A | 10/2002 |
| JP | 2003177336 A | 6/2003 |
| JP | 2003195201 A | 7/2003 |
| JP | 2003315732 A | 11/2003 |
| JP | 2003340795 A | 12/2003 |
| JP | 2004004553 | 1/2004 |
| JP | 2004012642 A | 1/2004 |
| JP | 2004029571 A | 1/2004 |
| JP | 2004157527 A | 6/2004 |
| JP | 2004212638 A | 7/2004 |
| JP | 2004212673 A | 7/2004 |
| JP | 2004212680 A | 7/2004 |
| JP | 2004235465 | 8/2004 |
| JP | 2004286825 A | 10/2004 |
| JP | 2005279831 A | 10/2005 |
| JP | 2005308871 A | 11/2005 |
| JP | 2007027150 A | 2/2007 |
| KR | 20020010322 | 2/2002 |

(56) References Cited

FOREIGN PATENT DOCUMENTS

| | | |
|---|---|---|
| TW | 157313 | 5/1991 |
| TW | 200522132 | 7/2005 |
| WO | WO-9105284 | 4/1991 |
| WO | WO-9210925 | 6/1992 |
| WO | WO-9406871 A1 | 3/1994 |
| WO | WO-9422045 | 9/1994 |
| WO | WO-9428452 A1 | 12/1994 |
| WO | WO-9429840 | 12/1994 |
| WO | WO-9501584 A1 | 1/1995 |
| WO | WO-9514256 A1 | 5/1995 |
| WO | WO-9515582 A1 | 6/1995 |
| WO | WO-9530924 A1 | 11/1995 |
| WO | WO-9608833 A1 | 3/1996 |
| WO | WO-9610889 A1 | 4/1996 |
| WO | WO-9616348 A1 | 5/1996 |
| WO | WO-9638319 A2 | 12/1996 |
| WO | WO-9701240 A1 | 1/1997 |
| WO | WO-9716756 A1 | 5/1997 |
| WO | WO-9717628 A1 | 5/1997 |
| WO | WO-9744707 A2 | 11/1997 |
| WO | WO-9746908 A1 | 12/1997 |
| WO | WO-9814804 A1 | 4/1998 |
| WO | WO-9819201 A1 | 5/1998 |
| WO | WO-9832047 A1 | 7/1998 |
| WO | WO-9835182 A1 | 8/1998 |
| WO | WO-9843129 A1 | 10/1998 |
| WO | WO 98/59382 | 12/1998 |
| WO | WO-9904296 A1 | 1/1999 |
| WO | WO-9952006 A2 | 10/1999 |
| WO | WO-0153113 A1 | 7/2001 |
| WO | WO-0173937 A2 | 10/2001 |
| WO | WO-0224570 A1 | 3/2002 |
| WO | WO-02063602 A1 | 8/2002 |
| WO | WO-02071132 A2 | 9/2002 |
| WO | WO-02079853 A1 | 10/2002 |
| WO | WO-02086582 A1 | 10/2002 |
| WO | WO-03007049 | 1/2003 |
| WO | WO-03014789 A2 | 2/2003 |
| WO | WO-03015071 A2 | 2/2003 |
| WO | WO-03044765 A2 | 5/2003 |
| WO | WO-03054925 A2 | 7/2003 |
| WO | WO-03056876 A2 | 7/2003 |
| WO | WO-03060940 A1 | 7/2003 |
| WO | WO-03069404 A1 | 8/2003 |
| WO | WO-03069413 A1 | 8/2003 |
| WO | WO-03073151 A1 | 9/2003 |
| WO | WO-03079323 A1 | 9/2003 |
| WO | WO-03085728 A1 | 10/2003 |
| WO | WO-03090199 A1 | 10/2003 |
| WO | WO-03105198 A1 | 12/2003 |
| WO | WO-2004006003 A1 | 1/2004 |
| WO | WO-2004026757 A2 | 4/2004 |
| WO | WO-2004049034 A1 | 6/2004 |
| WO | WO-2004054088 A2 | 6/2004 |
| WO | WO-2004075526 A2 | 9/2004 |
| WO | WO-2004088372 A1 | 10/2004 |
| WO | WO-2005006364 A1 | 1/2005 |
| WO | WO-2005011012 A1 | 2/2005 |
| WO | WO 2005/066596 | 7/2005 |
| WO | WO-2005076051 A1 | 8/2005 |
| WO | WO-2005093488 | 10/2005 |
| WO | WO-2005093490 | 10/2005 |
| WO | WO-2005122123 A1 | 12/2005 |
| WO | WO-2006008702 A2 | 1/2006 |
| WO | WO-2006014929 | 2/2006 |
| WO | WO-2006035698 A1 | 4/2006 |
| WO | WO-2006036440 | 4/2006 |
| WO | WO-2006036451 A1 | 4/2006 |
| WO | WO-2006036495 | 4/2006 |
| WO | WO-2006036519 | 4/2006 |
| WO | WO-2006036540 A1 | 4/2006 |
| WO | WO-2006036564 | 4/2006 |
| WO | WO-2006036588 | 4/2006 |
| WO | WO-2007036422 | 4/2007 |
| WO | WO-2007045875 A1 | 4/2007 |
| WO | WO-2007053438 A1 | 5/2007 |
| WO | WO-2007127046 | 11/2007 |
| WO | WO-2007149474 | 12/2007 |
| WO | WO-2008027275 | 3/2008 |
| WO | WO-2008039229 | 4/2008 |
| WO | WO-2008045200 | 4/2008 |
| WO | WO-2008045207 | 4/2008 |
| WO | WO-2008045218 A1 | 4/2008 |
| WO | WO-2008045222 A1 | 4/2008 |
| WO | WO-2008045224 | 4/2008 |
| WO | WO-2008045310 | 4/2008 |
| WO | WO-2008045311 A2 | 4/2008 |
| WO | WO-2008045312 A1 | 4/2008 |
| WO | WO-2008045362 A2 | 4/2008 |
| WO | WO-2008045363 | 4/2008 |
| WO | WO-2008045364 A2 | 4/2008 |
| WO | WO-2008045462 | 4/2008 |
| WO | WO-2008045463 | 4/2008 |
| WO | WO-2008069877 | 6/2008 |
| WO | WO-2008109620 A1 | 9/2008 |
| WO | WO-2008137299 | 11/2008 |
| WO | WO-2009006122 | 1/2009 |
| WO | WO-2009032525 A2 | 3/2009 |
| WO | WO-2009042497 A2 | 4/2009 |
| WO | WO-2009055223 A2 | 4/2009 |
| WO | WO-200906163 A2 | 5/2009 |
| WO | WO-2009073555 | 6/2009 |
| WO | WO-2009076075 | 6/2009 |

OTHER PUBLICATIONS

Invitation to Pay Additional Fees for PCT/US06/048318.
ISR and WO for PCT/US06/048318 filed Dec. 19, 2006.
IPRP for PCT/US06/048318 filed Dec. 19, 2006.
Office Action dated Jan. 29, 2008 in U.S. Appl. No. 11/331,705.
Office Action dated Aug. 11, 2008 in U.S. Appl. No. 11/331,705.
Office Action dated Jan. 7, 2009 in U.S. Appl. No. 11/331,705.
Office Action dated Jun. 1, 2009 in U.S. Appl. No. 11/331,705.
Office Action dated Dec. 1, 2009 in U.S. Appl. No. 11/331,705.
Office Action dated Jul. 12, 2010 in U.S. Apl. No. 11/331,705.
Amm, et al., "5.2 Grating Light Valve Technology Update and Novel Applications," presented at Society for Information Display Symposium, May 19, 1998.
Application as filed in U.S. App. No. 13/018,221, dated Jan. 31, 2011.
Application as filed in U.S. Appl. No. 13/232,226, dated Sep. 14, 2011.
Austrian Search Report for Ex144/2005 dated Aug. 11, 2005.
Austrian Search Report for U.S. Appl. No. 11/036,965 dated Jul. 25, 2005 (Publication No. 2005/0179977).
Austrian Search Report for U.S. Appl. No. 11/040,824 dated Jul. 14, 2005 (Publication No. 2006/077522).
Austrian Search Report for U.S. Appl. No. 11/057,392 dated May 12, 2005 (Publication No. 2006/077510).
Austrian Search Report for U.S. Appl. No. 11/064,143 dated Aug. 12, 2005.
Austrian Search Report for U.S. Appl. No. 11/140,561 dated Jul. 12, 2005.
Austrian Search Report for U.S. Appl. No. 11/051,258 dated May 13, 2005.
Austrian Search Report for U.S. Appl. No. 11/077,974 dated Jul. 14, 2005.
Austrian Search Report in U.S. Appl. No. 11/036,966 dated Jul. 28, 2005.
Austrian Search Report in U.S. Appl. No. 11/041,020 dated May 9, 2005.
Austrian Search Report in U.S. Appl. No. 11/083,841 mailed Jul. 14, 2005.
Austrian Search Report No. 140/2005, dated Jul. 15, 2005.
Austrian Search Report No. 150/2005, dated Jul. 29, 2005.
Austrian Search Report No. 161/2005, dated Jul. 15, 2005.
Austrian Search Report No. 162/2005, dated Jul. 14, 2005.
Austrian Search Report No. 164/2005, dated Jul. 4, 2005.
Austrian Search Report No. 66/2005 Dated May 9 2005.
Bouchaud J, et al., "RF MEMS Analysis forecasts And Technology Review Chip Unaxis," Sep. 2003, p. 26-29 [online] Retrieved From The Internet: «Url:Http://Semiconductors.Unaxis.Com/En/Download/Rf%20Mems.Pdf».

(56) References Cited

OTHER PUBLICATIONS

Dokmeci, et al., "Two-Axis Single-Crytal Silicon Micromirror Arrays," Journal of Microelectromechanical Systems, Dec. 2004, 13(6), 1006-1017.
Feenstra, et al., "Electrowetting displays," Liquavista BV, Jan. 2006, 16 pp.
Goossen K.W., "MEMS-Based Variable Optical Interference Devices," IEEE/Lens International Conference on Optical Mems, Conference Digest, Piscataway, NJ, USA, IEEE Aug. 21, 2000, pp. 17-18.
Lieberman, "MEMS Display Looks to Give PDAs Sharper Image," EE Times (Feb. 11, 1997).
Light Over Matter Circle No. 36, Jun. 1993.
Little, et al., "Vertically Coupled Glass Microring Resonator Channel Dropping Filters," IEEE Photonics Technology Letters, Feb. 1999, 11(2), 215-217.
Miles M.W., "A MEMS Based Interferometric Modulator (IMOD) for Display Applications" Proceedings of Sensors Expo, Oct. 21, 1997 © 1997 Helmer's Publishing, Inc. (Oct. 21, 1997), pp. 281-284 XP009058455.
Miles M.W., et al., "Interferometric Modulation MOEMS as an enabling technology for high-performance reflective displays," Proceedings of the SPIE, 2003, 4985, 131-139.
Miles M.W., "MEMS-Based Interferometric Modulator for Display Applications," Proceedings of SPIE Conference on Micromachined Devices and Components V, Sep. 1999, SPIE vol. 3876, pp. 20-28.
Nakagawa et al., "Wide-Field-of-View Narrow-Band Spectral Filters Based on Photonic Crystal Nanocavities", Optical Society of America, Optics Letters, vol. 27, No. 3, pp. 191-193, Feb. 1, 2002.
Newsbreaks, "Quantum-trench devices might operated at terahertz frequencies", Laser Focus World, May 1993.
Pape, et al., "Characteristics of the Deformable Mirror Device for Optical Information Processing," Optical Engineering, Nov.-Dec. 1983, 22(6), 676-681.
Petschick, et.al., "Fabry-Perot-Interferometer," available at http://pl.physik.tuberlin.de/groups/pg279/protokolless02/04_fpi.pdf, pp. 50-60, May 14, 2002.
U.S. Appl. No. 08/769,947, filed Dec. 19, 1996 by Miles, Mark W.
U.S. Appl. No. 10/909,228, filed Jul. 29, 2004 by Miles, Mark W.
U.S. Appl. No. 11/048,662, filed Jan. 27, 2005 by Cummings, William J.
U.S. Appl. No. 11/140,561, filed May 26, 2005 by Miles, Mark W.
U.S. Appl. No. 11/267,814, filed Nov. 4, 2005 by Miles, Mark W.
U.S. Appl. No. 11/267,929, filed Nov. 4, 2011 by Miles, Mark W.
U.S. Appl. No. 11/327,190, filed Jan. 6, 2006 by Miles, Mark W.
U.S. Appl. No. 11/347,013, filed Feb. 3, 2006 by Miles, Mark W.
U.S. Appl. No. 11/841,856, filed Aug. 20, 2007 by Miles, Mark W.
U.S. Appl. No. 11/841,876, filed Aug. 20, 2007 by Miles, Mark W.
U.S. Appl. No. 11/841,884, filed Aug. 20, 2007 by Miles, Mark W.
U.S. Appl. No. 11/841,894, filed Aug. 20, 2007 by Miles, Mark W.
U.S. Appl. No. 11/841,916, filed Aug. 20, 2007 by Miles, Mark W.
U.S. Appl. No. 11/841,924, filed Aug. 20, 2007 by Miles, Mark W.
U.S. Appl. No. 11/841,948, filed Aug. 20, 2007 by Miles, Mark W.
U.S. Appl. No. 11/841,961, filed Aug. 20, 2007 by Miles, Mark W.
U.S. Appl. No. 11/841,974, filed Aug. 20, 2007 by Miles, Mark W.
U.S. Appl. No. 11/841,988, filed Aug. 20, 2007 by Miles, Mark W.
U.S. Appl. No. 11/842,034, filed Aug. 20, 2007 by Miles, Mark W.
U.S. Appl. No. 12/967,375, filed Dec. 14, 2010 by Sampsell, Jeffrey Brian.
U.S. Appl. No. 13/401,138, filed Feb. 21, 2012 by Sasagawa Teruo.
U.S. Appl. No. 13/729,934, filed Dec. 28, 2012 by Sampsell Jeffrey B.
Wang, et al., "Flexible Circuit-Based RF MEMS Switches," Proceedings of 2001 ASME International Mechanical Engineering Congress and Exposition, Nov. 11-16, 2001 pp. 757-762.
Williams, et al., "Etch rates for Micromachining Processing Part II," Journal of Microelectromechanical Systems, Dec. 2003, 12(6), 761-778.
Winton et al., "A novel way to capture solar energy," Chemical Week, pp. 17-18 (May 15, 1985).
Written Opinion for PCT Application No. PCT/US99/07271 filed Apr. 1, 1999, pp. 1-11.
Abilieah A, "Optical Tiled AMLCD for Very Large Display Applications," SID International Symposium Digest of Papers, Boston, May 17, 1992, 945-949.
Akasaka Y., "Three-Dimensional IC Trends," Proceedings of IEEE, Dec. 1986, vol. 74 (12), pp. 1703-1714.
Aratani K, et al., "Process and Design Considerations for Surface Micromachined Beams for a Tuneable Interferometer Array in Silicon," Proc. IEEE Microelectromechanical workshop fort Lauderdale FL, Feb. 1993, 230-235.
Bains, "Digital Paper Display Technology Holds Promise for Portables," CommsDesign EE Times, Jul. 17, 2000.
Billard C, "Tunable Capacitor," 5th Annual Review of LETI, Jun. 24, 2003, p. 7.
Brosnihan, et al., "Optical MEMS—A Fabrication Process For MEMS Optical Switches With Integrated On-Chip Electronics," 12th International Conference on Transducers, Solid-State Sensors, Actuators and Microsystems, Jun. 8-12, 2003, vol. 2, pp. 1638-1642.
Butler, et al., "An Embedded Overlay Concept for Microsystems Packaging," IEEE Transactions on Advanced Packaging IEEE, Nov. 2000, vol. 23(4), 617-622.
Chan, et al., "Low-Actuation Voltage RF Mems Shunt Switch With Cold Switching Lifetime Of Seven Billion Cycles," Journal of Microelectromechanical Systems, Oct. 27, 2003, vol. 12(5), 713-719.
Chiou, et al., "A Novel Capacitance Control Design of Tunable Capacitor using Multiple Electrostatic Driving Electrodes," IEEE Nanoelectronics and Giga-Scale Systems, Oct. 29, 2001, 319-324.
De Coster, et al., "Variable RF Mems Capacitors With Extended Tuning Range," IEEE International Solid-State Sensors and Actuators Conference, Jun. 8-12, 2003, vol. 2, 1784-1787.
Fan, et al., "Channel Drop Filters in Photonic Crystals," Optics Express, Jul. 6, 1998, vol. 3(1), pp. 4-11.
Furneaux, et al., "The Formation of Controlled-Porosity Membranes from Anodically Oxidized Aluminium," Nature, Jan. 12, 1989, vol. 337, 147-149.
Giles, et al., "A Silicon Mems Optical Switch Attenuator And its Use In Lightwave Subsystems," IEEE Journal of Selected Topics in Quantum Electronics, Jan.-Feb. 1999, 5 (1), 18-25.
Goossen, et al., "Silicon Modulator Based On Mechnically-Active Anti-Reflection Layer With 1Mbit/Sec Capability For Fiber-In-The-Loop Applications," IEEE Photonics Technology Letters, Sep. 1994, 1119-1121.
Goossen K.W. et al., "Possible Display Applications Of The Silicon Mechanical Antireflection Switch," Society for Information Display, Aug. 24, 1994.
Gosch, "West Germany Grabs the Lead in X-Ray Lithography," Electronics, Feb. 5, 1987, 78-80.
Hohlfeld, et al., "Micro-Machined Tunable Optical Filters With Optimized Band-Pass Spectrum," 12th International Conference on Transducers, Solid-State Sensors, Actuators and Microsystems, Jun. 8-12, 2003, vol. 2, 1494-1497.
Ibbotson, et al., "Comparison of $XeF_2$ and F-atom Reactions with Si and $SiO_2$," Applied Physics Letters, Mar. 28, 1984, 44(12), 1129-1131.
Jackson, "Classical Electrodynamics," John Wiley & Sons Inc, Nov. 1962, pp. 568-573.
Kim, et al., "Control of Optical Transmission Through Metals Perforated With Subwave-Length Hole Arrays," Optic Letters, Feb. 15, 1999, vol. 24(4), 256-258.
Lin, et al., "Free-Space Micromachined Optical Switches for Optical NetWorking," IEEE Journal of Selected Topics in Quantum Electronics, Jan./Feb. 1999, vol. 5(1), 4-9.
Londergan, et al., "Advanced processes for MEMS-based displays," Proceedings of the Asia Display, Apr. 2, 2007, SID, 1, 107-112.
Mait, "Designs of Diffractive Optical Elements for Optical Signal Processing," IEEE Lasers and Electro-Optics Society Annual Meeting, Nov. 15-18, 1993, 59-60.
Mishima, et al., "High-Performance CMOS Circuits Fabricated by Excimer-Laser-Annealed Poly-Si TFT's on Glass Substrates," IEEE Electron Device Letters, Feb. 2001, vol. 22(2), pp. 89-91.

(56) References Cited

OTHER PUBLICATIONS

Nieminen, et al., "Design of a Temperature-Stable RF MEMS Capacitor," Institute of Electrical and Electronics Engineers (IEEE) Journal of Microelectromechanical Systems, Oct. 2004, vol. 13(5), 705-714.

Oz, et al., "CMOS-Compatible RF-MEMS Tunable Capacitors," IEEE MTT-S International Microwave Symposium IMS, Jun. 8-13, 2003, A97-A100.

Peerlings et al., "Long Resonator Micromachined Tunable GaAs-AlAs Fabry-Perot Filter," IEEE Photonics Technology Letters, IEEE Service Center, Sep. 1997, vol. 9(9), 1235-1237.

Science and Technology, The Economist, pp. 89-90, (May 22, 1999).

Seeger, et al., "Stabilization of Electrostatically Actuated Mechanical Devices," International Conference on Solid State Sensors and Actuators, Jun. 16-19, 1997, vol. 2, 1133-1136.

Seeger J.I., et al., "Dynamics and Control of Parallel-Plate Actuators Beyond the Electrostatic Instability," Transducers '99, the 10th International Conference on Solid-State Sensors and Actuators, Jun. 7-9, 1999, pp. 474-477.

Solgaard, et al., "Interference-Based Optical MEMS Filters," Optical 2004 Fiber Communication Conference, Feb. 23-25, 2004, vol. 1.

Taii Y. et al., "A Transparent Sheet Display By Plastic MEMS," Journal of the SID, Aug. 2006, vol. 14 (8), 735-741.

Walker, et al., "Electron-Beam-Tunable Interference Filter Spatial Light Modulator," Optics Letters, Feb. 1988, vol. 13(5), 345-347.

Wang, et al., "Design and Fabrication of a Novel TWO-Dimension MEMS-Based Tunable Capacitor," IEEE International Conference on Communications, Circuits and Systems and West Sino Expositions, Jun. 29-Jul. 1, 2002, vol. 2, 1766-1769.

Winters, et al., "The Etching of Silicon with XeF2 Vapor," Applied Physics Letters, Jan. 1, 1979, vol. 34(1), 70-73.

\* cited by examiner

US 8,971,675 B2

INTERCONNECT STRUCTURE FOR MEMS DEVICE

CROSS-REFERENCE TO RELATED APPLICATIONS

This application is a continuation of U.S. patent application Ser. No. 11/331,705, filed on Jan. 13, 2006, which is incorporated herein by reference in its entirety.

BACKGROUND OF THE INVENTION

1. Field of the Invention

The field of the invention relates to microelectromechanical systems (MEMS). More specifically, the invention relates to a MEMS device having interconnect structure.

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may have a pair of conductive plates, one or both of which may be transparent and/or reflective in whole or part and capable of relative motion upon application of an appropriate electrical signal. In this type of device, one plate may be a stationary layer deposited on a substrate and the other plate may be a metallic membrane separated from the stationary layer by an air gap. The position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

One embodiment is an electronic device, including a substrate, an array of interferometric light modulators formed on the substrate, and a plurality of interconnects formed adjacent a plurality of the interferometric modulators, where each interconnect is configured to connect a single light modulator to a circuit.

Another embodiment is a method of manufacturing an electronic device, the method including providing a substrate including an array of interferometric light modulators formed on the substrate, and forming a plurality of interconnects adjacent a plurality of the interferometric modulators, where each interconnect is configured to connect a single light modulator to a circuit.

Another embodiment is an electronic device, including a substrate, and an interferometric modulator disposed on the substrate. The interferometric modulator includes a cavity defined by an upper layer and a lower layer, and an encapsulation layer formed adjacent to the interferometric modulator. The encapsulation layer has an electrical connection that connects the interferometric modulator to an electronic circuit, and the encapsulation layer hermetically seals the cavity from the ambient environment.

Another embodiment is a method of manufacturing a light modulator device. This method includes forming an interferometric modulator having first and second layers defining a cavity and configured to interferometrically modulate light, forming an encapsulation layer adjacent to the cavity, the layer including one or more orifices, inducing a vacuum or inert atmosphere in the cavity, and sealing the one or more holes where the sealing maintains the vacuum or inert atmosphere in the cavity.

Another embodiment is an electronic device, including means for transmitting light, an array of means for modulating light formed on the transmitting means, and a plurality of means for interconnecting formed adjacent a plurality of the light modulating means, where each of the interconnecting means is configured to connect a single light modulating means to a circuit.

DETAILED DESCRIPTION OF CERTAIN EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Some embodiments include an interferometric modulator with one or more additional features. One additional feature is an encapsulation layer which hermetically seals the interferometric modulator, and which may have one or more electrical connections to the interferometric modulator. Another additional feature is a connection bump formed near the interferometric modulator and configured to make an electrical connection to an electronic circuit. In some embodiments electrical circuitry may be included between the interferometric modulators and the bumps, and the electrical circuitry may connect to either or both of the interferometric modulators and the bumps.

Figure 1:
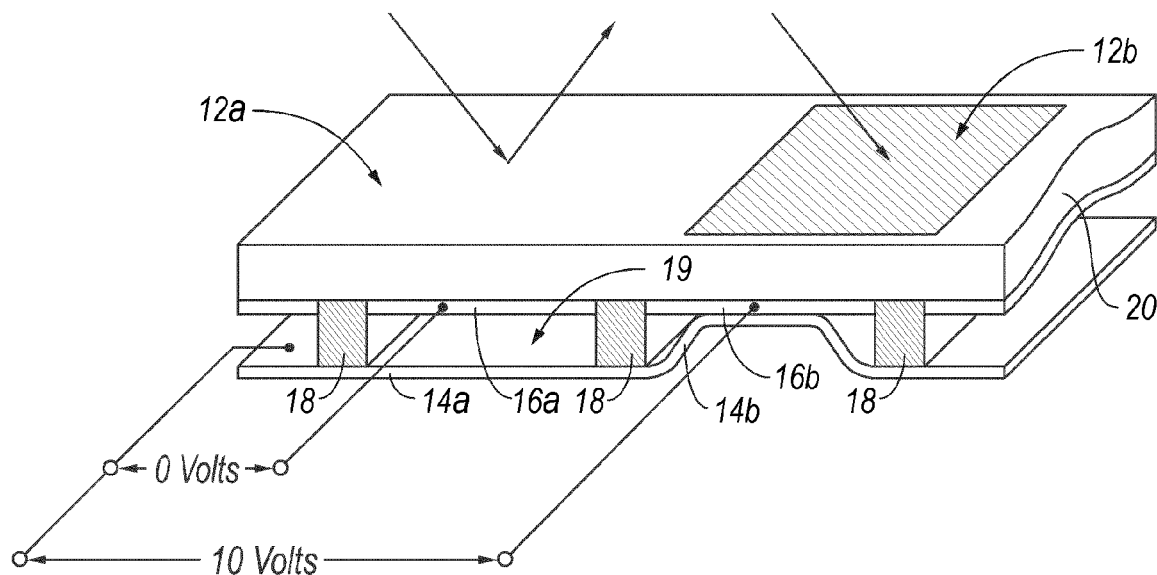
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. The partially reflective layer can be formed from a variety of materials that are partially reflective such as various metals, semiconductors, and dielectrics. Some examples of suitable materials include oxides, nitrides, and fluorides. Other examples include germanium (Ge), nickel silicide (NiSi), molybdenum (Mo), titanium (Ti), tantalum (Ta), and platinum (Pt). The partially reflective layer can be formed of one or more layers of materials, and each of the layers can be formed of a single material or a combination of materials.

In some embodiments, the layers of the optical stack are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
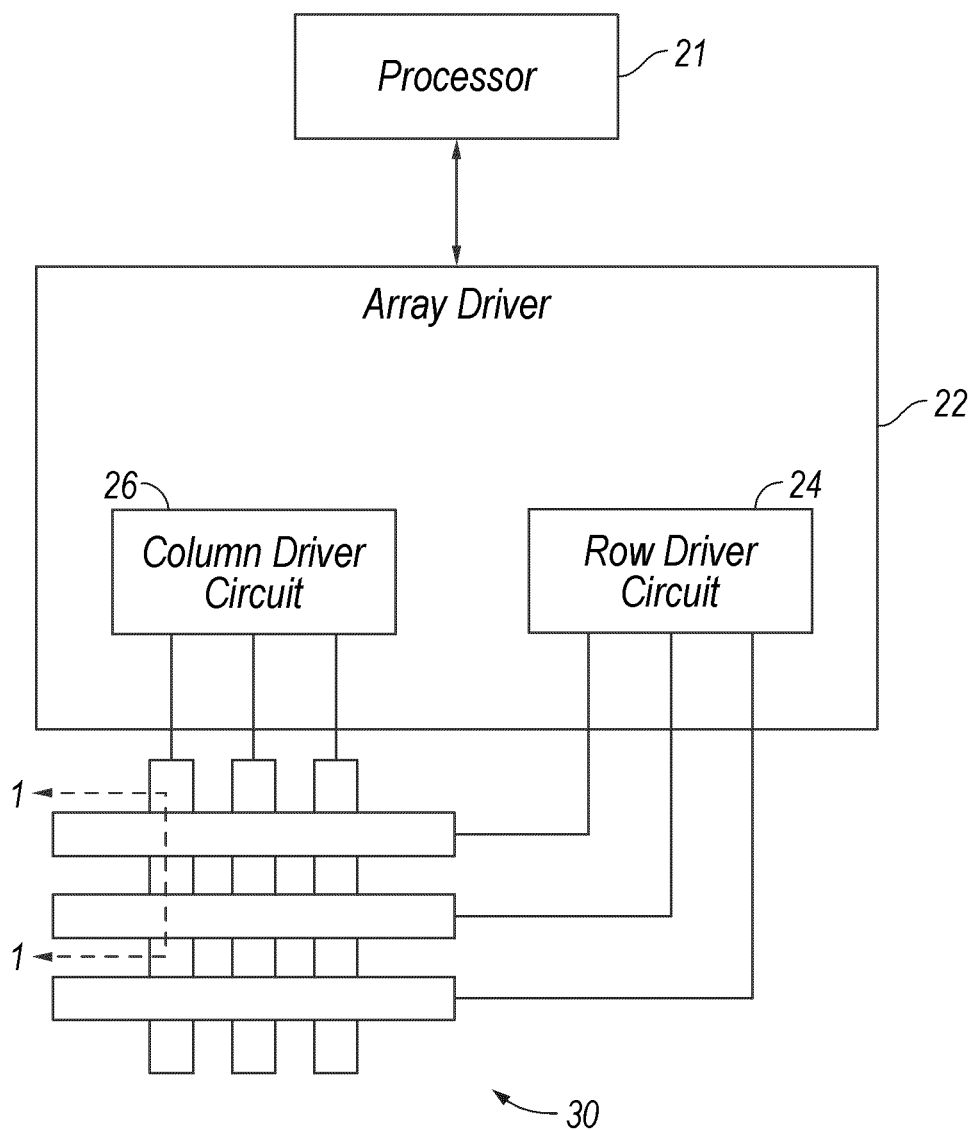
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051,a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
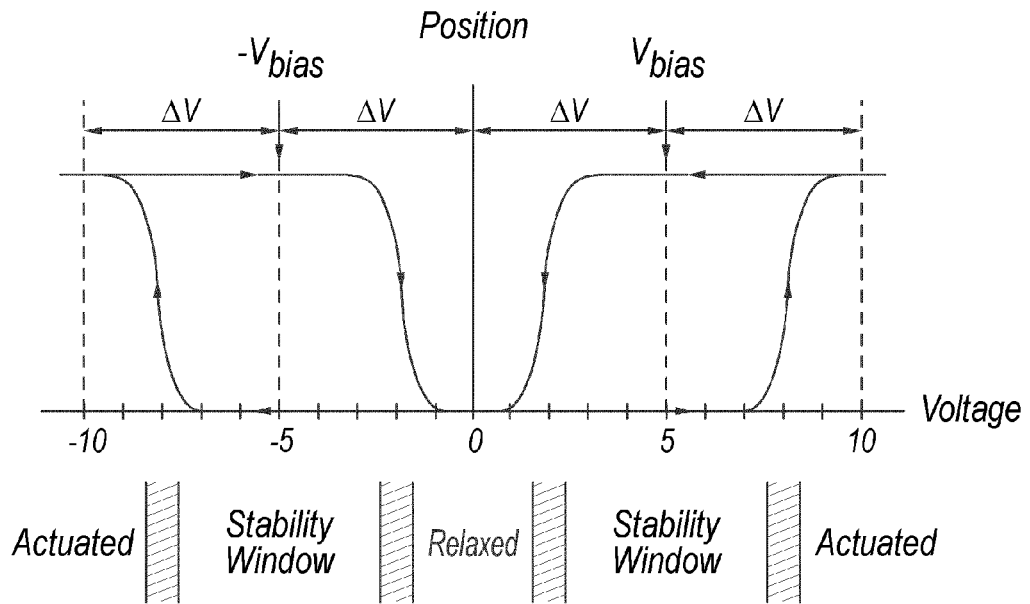
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
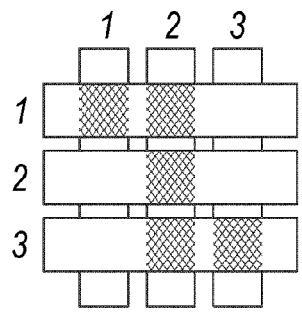
FIGS. 5A and 5B illustrate one exemplary timing diagram for row and column signals that may be used to write a frame of display data to the 3×3 interferometric modulator display of FIG. 2.
Figure 5B:
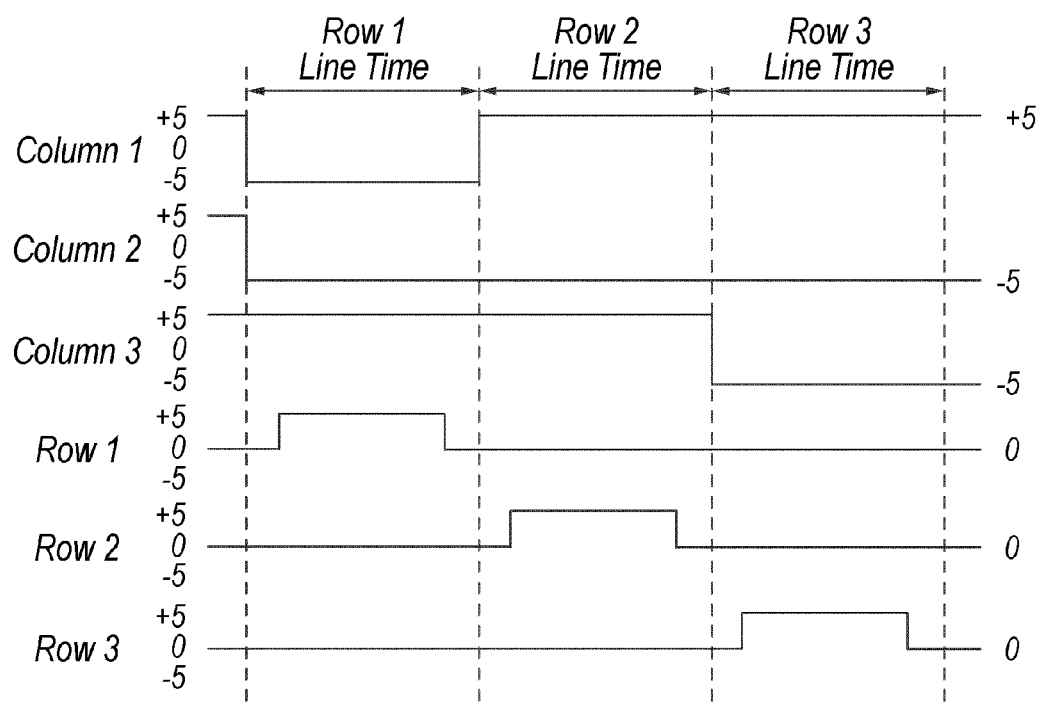

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
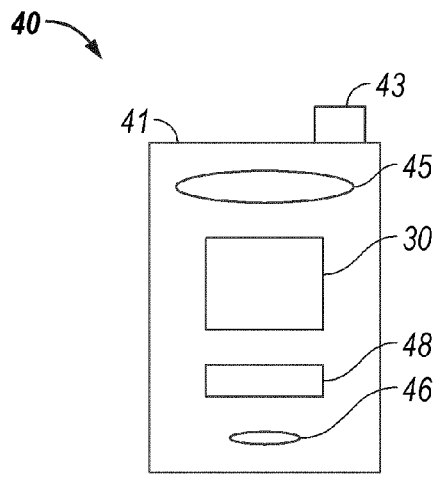
FIGS. 6A and 6B are system block diagrams illustrating an embodiment of a visual display device comprising a plurality of interferometric modulators.
Figure 6B:
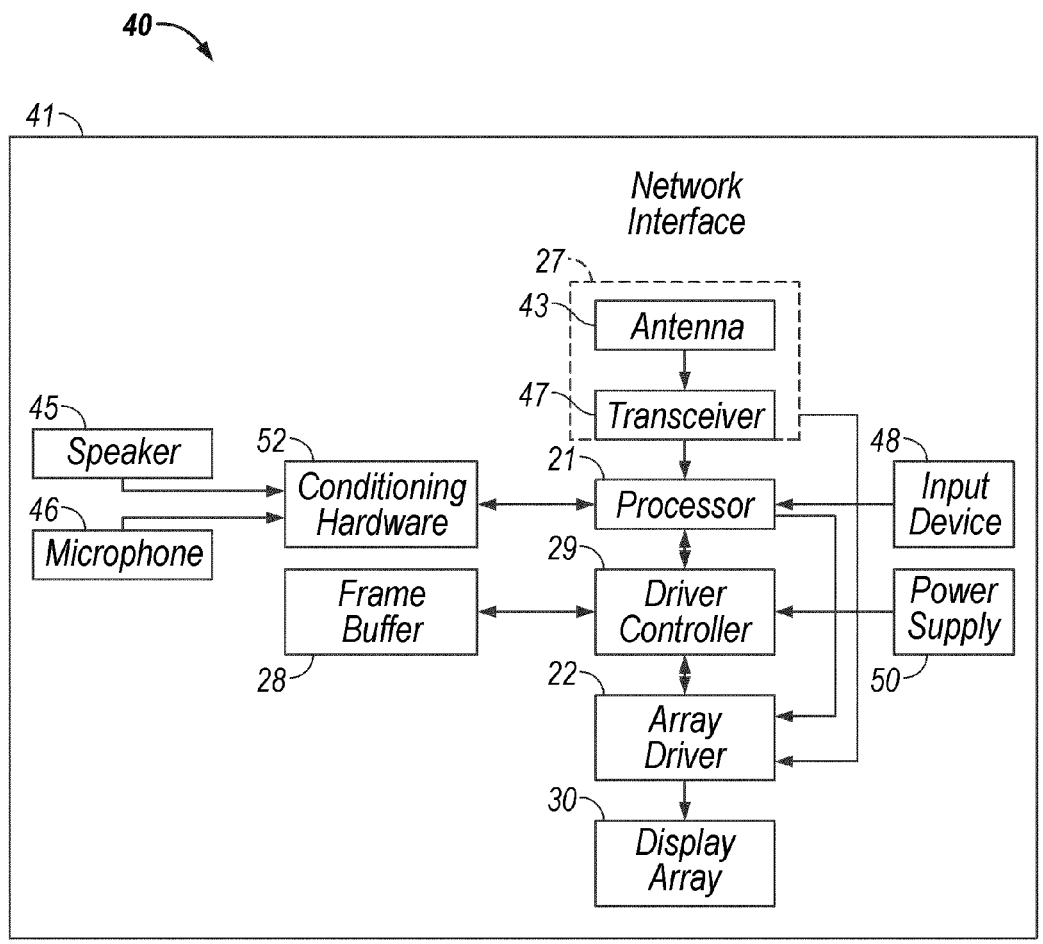

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 44, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
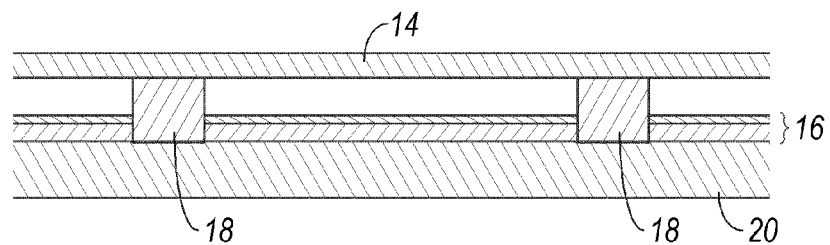
FIG. 7A is a cross section of the device of FIG. 1.
Figure 7B:
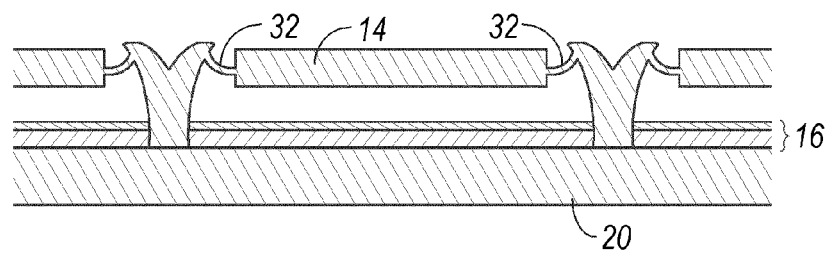
FIG. 7B is a cross section of an alternative embodiment of an interferometric modulator.
Figure 7C:
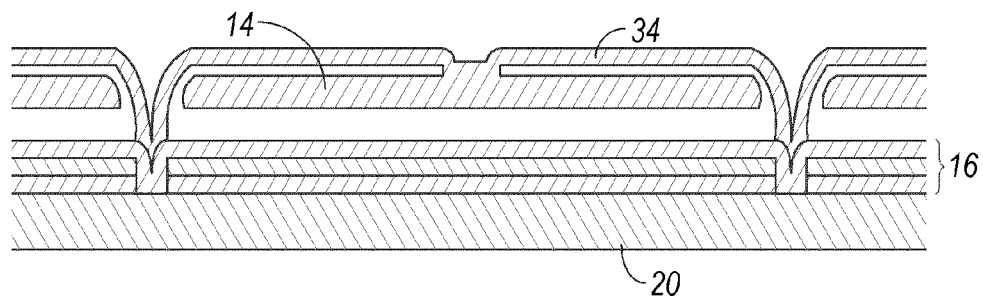
FIG. 7C is a cross section of another alternative embodiment of an interferometric modulator.
Figure 7D:
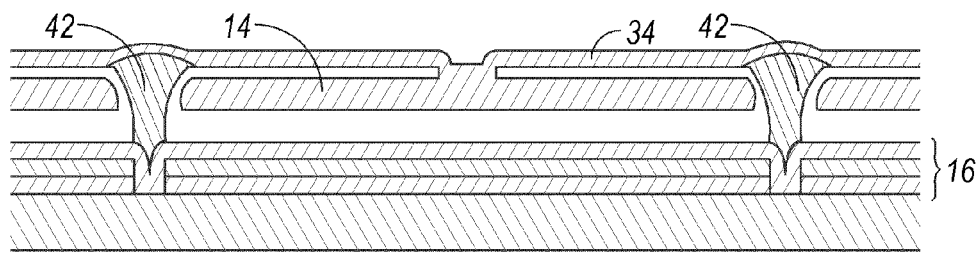
FIG. 7D is a cross section of yet another alternative embodiment of an interferometric modulator.
Figure 7E:
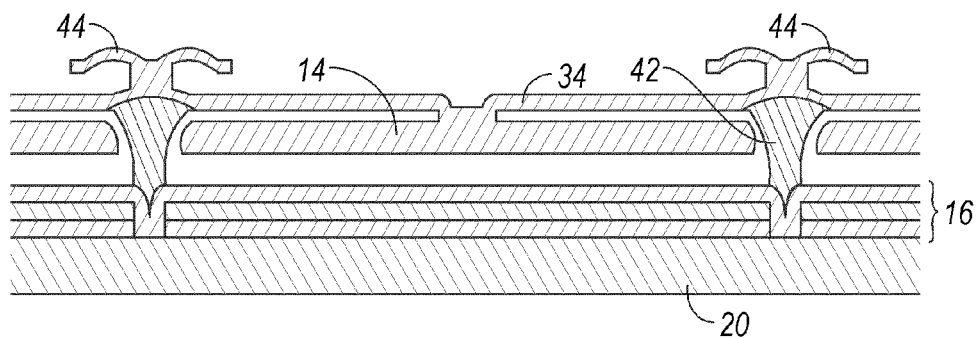
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Figure 8:
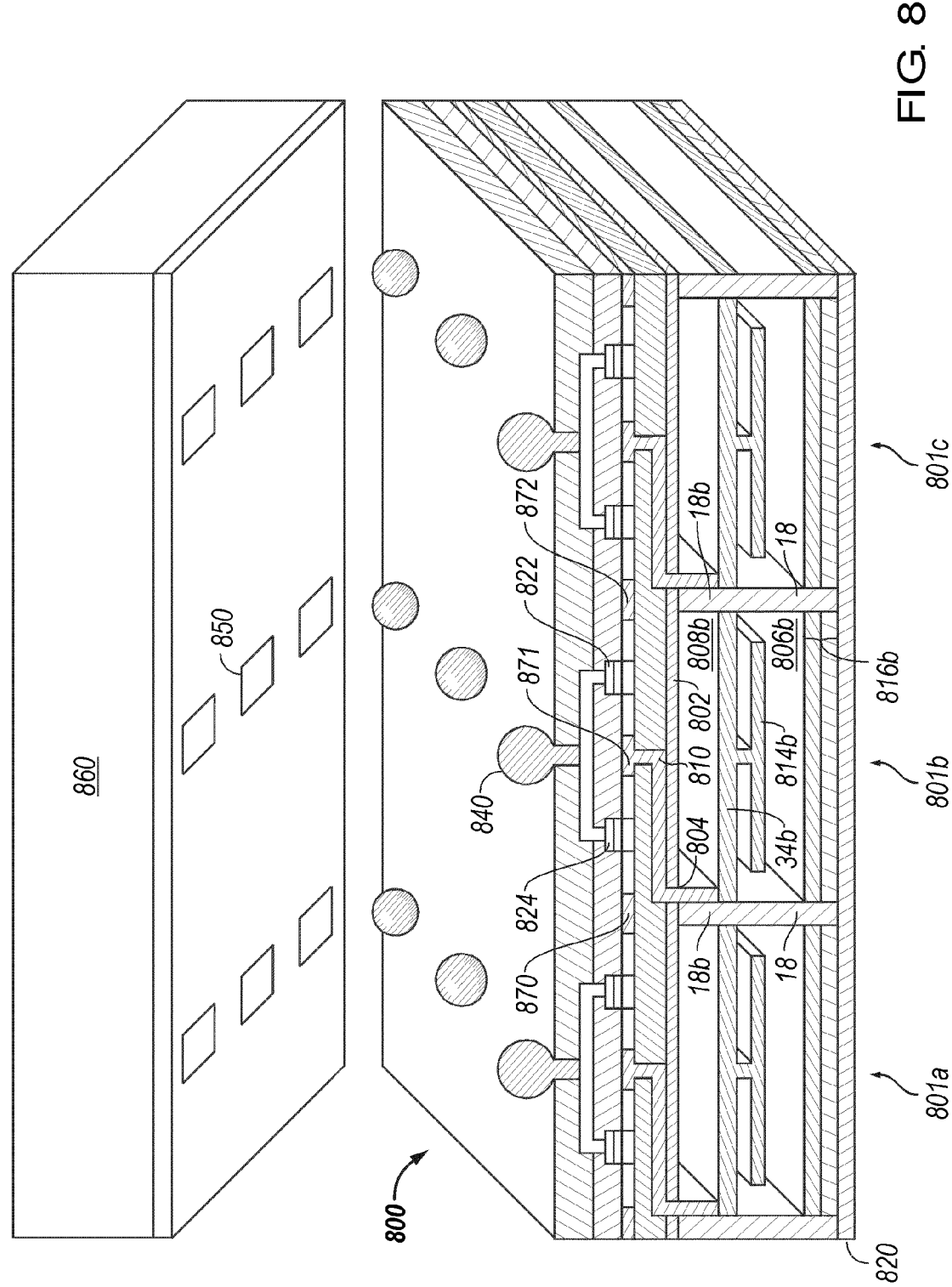
FIG. 8 is a cross section of an embodiment of an interferometric modulator with additional features.

FIG. 8 is an illustration of an exemplary embodiment of an interferometric modulator array 800 showing a cross-sectional view of interferometric modulators 801*a*, 801*b*, and 801*c*. As shown, interferometric modulators 801*a*, 801*b*, and 801*c* each have features similar to those previously discussed above. Also shown are additional features which have been formed above the structures previously discussed. In some embodiments the interferometric modulator array may be processed above these additional features. One skilled in the art will recognize that these features are combinable with interferometric modulators of any of the previously discussed embodiments, as well as other interferometric modulator embodiments not discussed.

Referring to FIG. 8, as in the embodiments previously discussed the interferometric modulator structures are formed on a transparent substrate 820. Although in other embodiments an array may comprise various types of interferometric modulators, in this embodiment the interferometric modulators 801*a*, 801*b*, and 801*c* are identical, and the structure of these interferometric modulators will now be described with reference to interferometric modulator 801*b* only. Posts 18*a* are formed on the substrate 820, and define the boundaries for adjacent interferometric modulators. An optical stack 816*b* is formed on the substrate 820 between the posts 18*a*. The posts 18*a* support a deformable layer 34*b* from which a reflective layer 814*b* is suspended. The reflective layer 814*b* is suspended so as to be spaced apart from the optical stack 816*b* such that an interferometric cavity 806*b* is formed between the optical stack 816*b* and the reflective layer 814*b*. As discussed above, movement of the reflective layer 814*b* with respect to the optical stack 816*b* affects the dimensions, and therefore the interferometric properties, of the cavity 806*b*. Movement of the reflective layer 814*b* is controlled by a providing a voltage difference between the optical stack 816*b* and the deformable layer 34*b*. In this embodiment the additional features above the interferometric modulator provide an electrical connection to the deformable layer 34*b*.

As shown in FIG. 8, posts 18*a* are extended vertically by addition of supports 18*b*. An encapsulation layer 802 is supported by the supports 18*b*, and has a via 804 adjacent to one of the supports 18*b*. The via 804 electrically connects the deformable layer 34*b* to a first interconnect 810, which is connected to additional circuitry. In this embodiment the circuitry comprises an inverter with PMOS transistor 822 and NMOS transistor 824. The input to the inverter 822 is connected to a connection bump 840 which is part of a 3×3 array of connection bumps 841 that is formed on an upper layer 844 of the modulator array 800. In some embodiments connection bumps 840 are not used. As can be envisioned, with this structure each deformable layer in the modulator array 800 can be directly connected to another circuit. For example, in the modulator array 800, the deformable layer 34*b* directly connects through interconnect 810 to the connection bump 840, which may be connected to another circuit. All other, or substantially all other, deformable layers within the modulator array can similarly connect through individual adjacent interconnects to individual connectors so that each deformable layer is capable of being individually addressed and controlled by the driver circuitry. Thus, the device has a plurality of interconnects formed adjacent a plurality of the interferometric modulators, where each interconnect is configured to connect a single light modulator to a circuit. Accordingly, this is a device with an array of means for modulating light formed on a transmitting means, and a plurality of means for interconnecting formed adjacent a plurality of the light modulating means, where each of the interconnecting means is configured to connect a single light modulating means to a circuit.

In some embodiments, the portion of deformable layers configured to be individually addressable is about 100%, however 1% through 99% of the deformable layers are individually addressable in other embodiments, for example one embodiment may have about 10%, about 20%, about 30%, about 40%, about 50%, about 60%, about 70%, about 80%, or about 90% of its deformable layers individually addressable.

A separate electronic device 860 provides a 3×3 array of connection pads 862 that is configured to mate with the a 3×3 array of connection bumps 841 on the interferometric modulator array 800. As indicated in FIG. 8, a connection bump 840 on the interferometric modulator array 800 is configured to align with a connection pad 850 on the electronic device 860 in order to provide an electrical connection between the device 860 and the modulator 801*b*.

In the embodiment shown in FIG. 8, the interferometric modulators 801*a-c* are enclosed by the encapsulation layer 802. The encapsulation layer 802 may provide a hermetic seal for the interferometric modulator in order to protect it from environmental agents such as moisture and oxygen. The seal also allows for pressure within the interferometric modulators 801*a-c* to be maintained independent from external pressure of the ambient environment. Thus, the interferometric modulators 801*a-c* may be fabricated to maintain environments that differ from the ambient environment. For example, during manufacturing, the encapsulation layer 802 can be manufactured with via 804 that provides a through hole from the ambient environment to the interferometric modulator 801*b*. The via 804 can then be filled by providing the first interconnect layer serves both to seal the encapsulation layer 802 and provides an electrical connection to the deformable layer 34*b*. In some embodiments the encapsulation layer seals all interferometric modulators in an array from the ambient environment, while in other embodiments only a portion of the interferometric modulators are sealed by the encapsulation layer. For example, an array may comprise some interferometric modulators which are not addressed. Such interferometric modulators have a reflective layer manufactured at a known fixed position, and do not therefore need to have encapsulation layer comprising an electrical connection to them.

When the reflective layer 814*b*, and the deformable layer 34*b* move between the actuated and relaxed states, orifices within the deformable layer 34*b* (not shown in the cross-section of FIG. 8) allow for gasses to flow between the cavity 806*b* below the deformable layer 34*b* and the cavity 808*b* above the deformable layer 34*b*. The viscosity of the gasses within the cavity may slow the movement between cavities. Sealing the interferometric modulator array at the time of manufacturing allows for deliberate customization of the cavity environment. Because of the permanent nature of the encapsulation, the environment within each cavity can persist throughout the lifetime of the array. For example, inducing a vacuum before sealing cavity 806*b* will substantially remove the gasses from the cavity portions 806*b*, and 808*b*, so that during use, the movement of the reflective layer 814*b* and the deformable layer 34*b* is not impeded by the cavity atmosphere. It should be realized that interferometric modulator arrays are typically sealed from the ambient environment by sealing a backplate to protect the array from the outside environment. While this type of sealant may still be used, it may also be unnecessary because the encapsulation layer 802 can also serve to protect the interior cavities from being affected by the ambient environment. Similarly, embodiments of the invention may also include the use of a desiccant to reduce the moisture levels within a cavity. However, the use of such desiccant may unnecessary in view of the fact that the cavities may be hermetically sealed by the encapsulation layer.

In some embodiments the encapsulation layer 802 is spaced apart from the relaxed state position of the deformable layer 34*b* by the introduction of an intermediate layer. The introduction of such an intermediate layer may also improve reliability of the device. During operation, the deformable layer 34*b* may forcefully move from an actuated position close to the optical stack 816*b* to the relaxed position away from the optical stack 816*b*. Maintaining the cavity 808*b* above the deformable layer 34*b* allows for the deformable layer 34*b* to "overshoot" the final relaxed state because of the mechanical restorative force. Without the cavity, the deformable layer would collide with the encapsulating layer, potentially damaging the structure and shortening the life of the encapsulating layer and/or the mechanical interferometric modulator structure.

As shown in FIG. 8, in some embodiments the encapsulation layer 802 comprises the via 804 which makes an electrical connection between the deformable layer 34 and a first interconnect layer 810. The interconnect layer 810 can be routed to circuitry to be connected to the interferometric modulator. The circuitry may comprise passive and active elements, such as routing wires, resistors, capacitors, inductors, diodes, and transistors. These elements may also include variable elements, such as variable resistors and variable capacitors. The type of circuit elements is not limited and other types of circuit elements may also be used. The circuitry may comprise display driver circuitry for at least one of rows, columns, portions of rows and/or columns, and individual deformable layers. The circuitry may additionally or alternatively comprise sense circuitry, used to determine the state of individual deformable layers or groups (such as rows or columns) of deformable layers. ESD protection, EM shielding, and interconnect routing may also be included in the circuitry. In some embodiments the circuitry may also comprise digital signal processing (DSP) functions such as data filtering and control information decoding. In some embodiments the circuitry may comprise RF functions such as an antenna and a power amp, as well as data converters. The type and function of the circuitry is not limited and other types and functions may be implemented.

The interferometric modulators may also be connected to intermediate connectors configured to make connections to other circuits. Such connectors include bond-pads and bumps, such as those used in a ball grid array (BGA). In some embodiments the circuitry and/or connectors are outside the perimeter of the interferometric modulator array. The interferometric modulators may be connected to the connectors through the interconnect layers only, or through the circuitry, as in FIG. 8, where the interferometric modulators are connected to the interconnect layer 810, which is connected to the inverter (the circuitry), which is connected to the connector 840.

Figure 9:
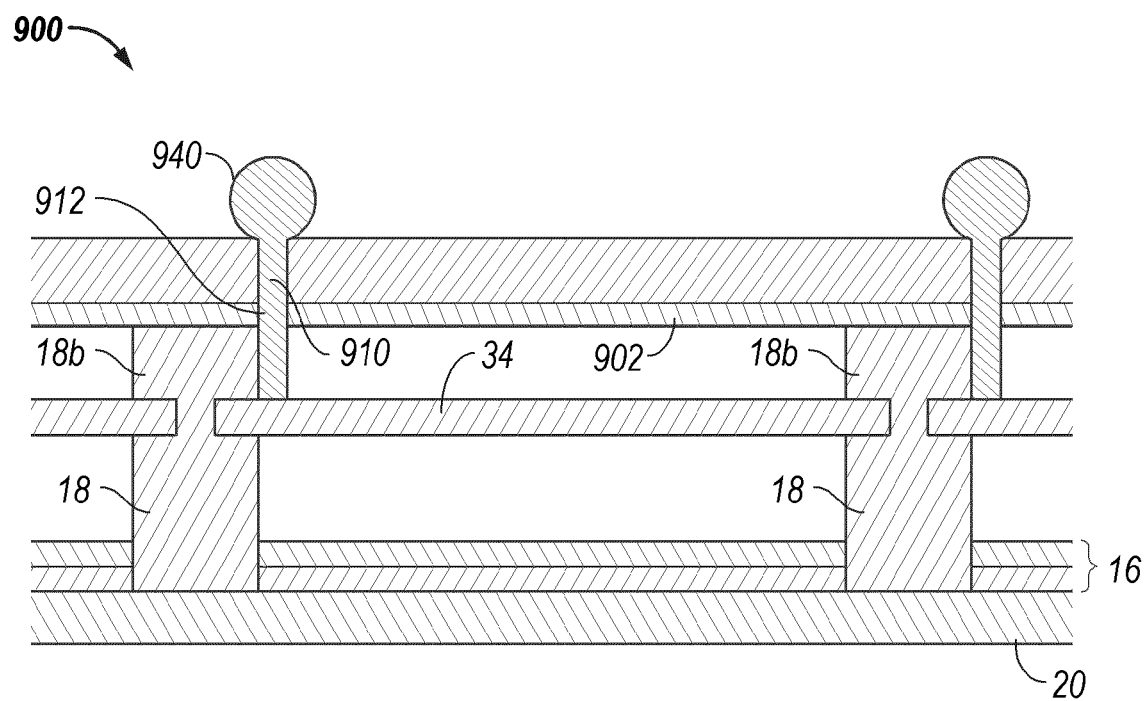
FIG. 9 is another cross section of an embodiment of an interferometric modulator with additional features.

In some embodiments circuitry and/or connectors are within the perimeter of the interferometric modulator array. An advantageous aspect of this arrangement is that it allows for short routing connections. Such an embodiment is shown in FIG. 9 as interferometric modulator 900. Similar to the embodiment described with reference to FIG. 8, interferometric modulator 900 is formed on a substrate 20. Posts 18*a* are formed to define lateral boundaries, and an optical stack 16 is formed on the substrate 20 between the posts 18*a*. A movable reflective layer 34 is formed on the posts. This embodiment has circuitry between the deformable layer 34 and a connection bump 940, wherein the circuitry consists only of interconnect 910, which comprises a via 912 sealing the encapsulation layer 902 from the ambient environment. In some embodiments the encapsulation layer is not present.

The short interconnect 910 has lower parasitic parameters, such as resistance, capacitance, and inductance than it would if it were longer. Similarly, in some embodiments a second connector, such as a second bump, (not shown) can provide a short routing connection to an electrode in the optical stack 16. The second bump may connect to the electrode in the optical stack 16 through, for example, a conductive element (not shown) adjacent to or as part of the supports 18 and 18b. In some embodiments other types of connectors may be used, such as a bond pad. In some embodiments the connectors are arranged with a pitch between about 40 microns and about 60 microns.

Figure 10A:
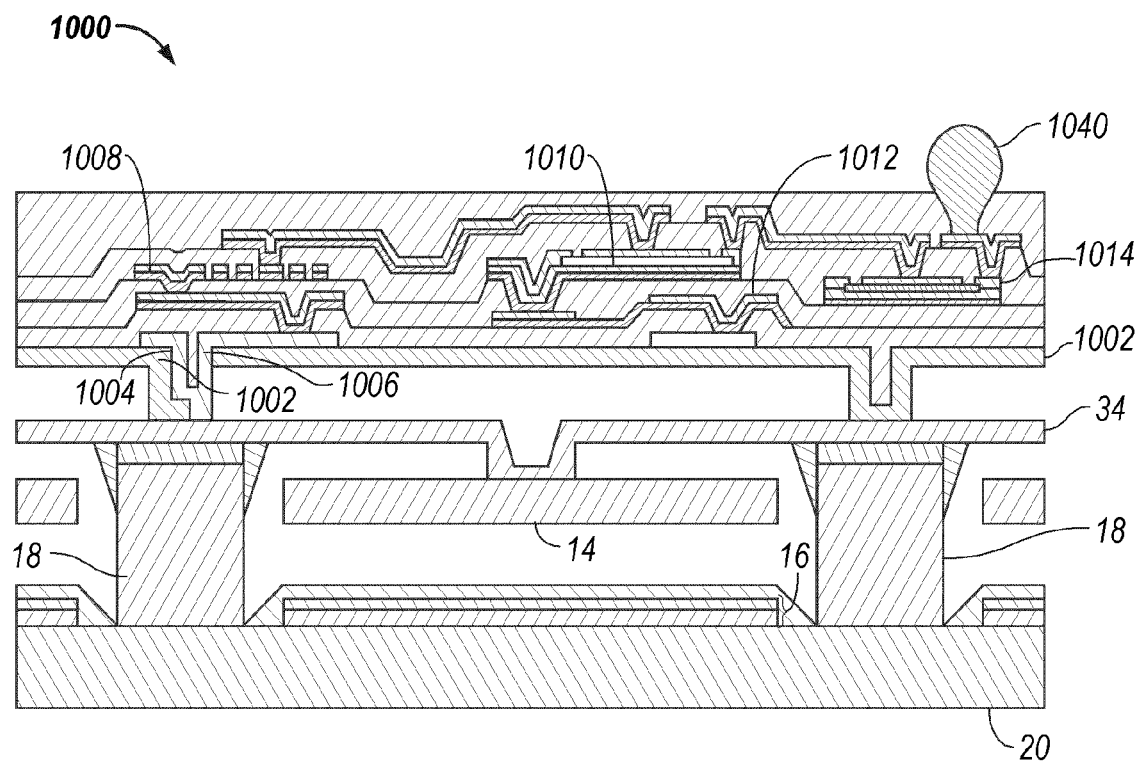
FIGS. 10A and 10B are cross-sectional and top views, respectively, of another embodiment of an interferometric modulator with additional features.
Figure 10B:
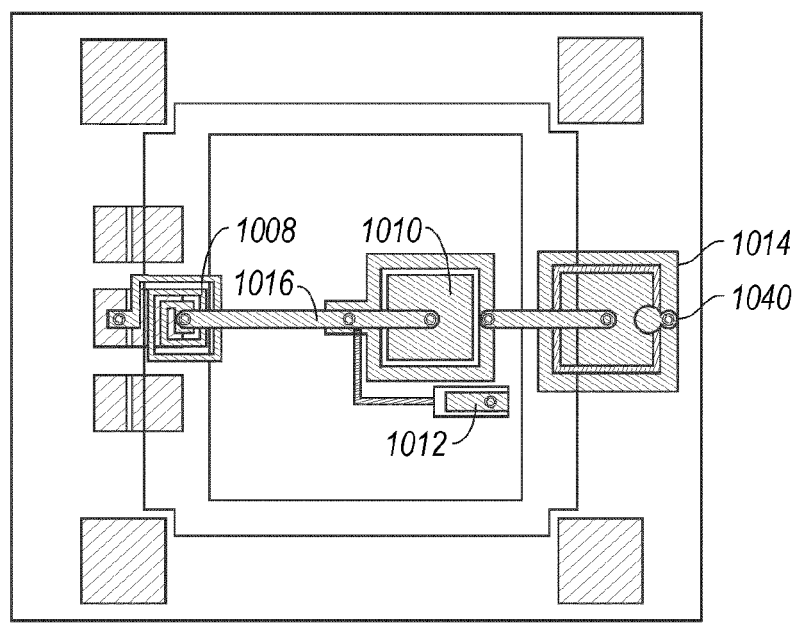

FIGS. 10A and 10B are cross-sectional and top views, respectively, of another embodiment of an interferometric modulator 1000. One or more sacrificial layers are deposited during the fabrication of the interferometric modulator. The sacrificial layers at least provide a structural substrate for deposition of the layers which form the interferometric modulator. Once the layers forming the interferometric modulator are deposited, the sacrificial layers are removed, leaving only the interferometric modulator. In some cases the spaces previously occupied by the sacrificial layers then become cavities which allow for the mirror and the mechanical layer to move according to the operation of the interferometric modulator discussed above.

The interferometric modulator 1000 may be formed according to the following process. Posts 18 are formed on the substrate 20, and optical stack 16 formed on the substrate 20 between the posts 18. A first sacrificial layer is deposited on the optical stack 16. A reflective layer 14 is then formed on the first sacrificial layer. Next, a second sacrificial layer is deposited on the reflective layer 14. The second sacrificial layer is etched so as to expose the reflective layer 14 in a region between the posts 18, and a mechanical layer 34 is then formed on the posts 18, the etched second sacrificial layer, and the portion of the reflective layer 14 exposed by etching the second sacrificial layer.

In some embodiments, a third sacrificial layer is deposited above the mechanical layer. The third sacrificial layer may then be etched according to a desired contour for the encapsulation layer 1002, which is deposited on the third sacrificial layer. As seen from FIG. 10A, in this embodiment, the third sacrificial layer was etched so that the encapsulation layer contacts the mechanical layer in regions adjacent to the posts and is spaced apart from the mechanical layer in regions adjacent to the mirror.

In some embodiments the after the encapsulation layer is deposited, one or more orifices 1004 may be generated in the encapsulation layer by, for example, etching. After the orifices 1004 have been generated, the sacrificial layers may be removed. In some embodiments the orifices provide a path or the only path through which etching agents access the sacrificial layers and/or provide a path or the only path through which the etching agents and sacrificial layer materials are evacuated from the region between the encapsulation layer and the substrate.

Once the sacrificial layers are removed, the orifices 1004 in the encapsulation layer 1002 may be closed to hermetically seal the interferometric cavity from the ambient environment. In some embodiments prior to closing the orifices 1004, the atmosphere within the interferometric cavity may be altered. For example, a vacuum may be induced, or an inert atmosphere may be generated between the encapsulation layer and the substrate. After the desired atmosphere is generated, the orifices may be closed while maintaining the desired atmosphere. The orifices may be closed with various materials including, but not limited to substantially non-conductive materials, and substantially conductive materials.

In some embodiments at least some of the orifices may be closed using a conductive material. The conductive material may contact the mechanical layer and form a via 1006, as seen in FIG. 10A. As discussed above, the via 1006 provides an electrical connection to the mechanical layer 34 through the encapsulation layer 1002.

The via 1006 may be used to electrically connect the mechanical layer 34 to other interconnect layers and to circuitry. Using semiconductor fabrication techniques such as deposition of materials and sacrificial layers, and etching the materials and sacrificial layers, the other interconnect layers and the circuitry may be fabricated adjacent to the interferometric modulator. For example, as shown in FIG. 10A, passive circuitry including an inductor 1008, a capacitor 1010, and a resistor 1012 have been fabricated adjacent to the device, above the encapsulation layer 1002. In this embodiment, an active circuit element, a diode 1014, has also been fabricated adjacent to the device. The active and passive circuit elements may be electrically connected either directly or indirectly to the interferometric device.

Also shown in FIG. 10A is a connection bump 1040. In this embodiment the connection bump 1040 is connected to some of the circuitry fabricated adjacent to the interferometric modulator. The connection bump 1040 is configured to electrically connect the interferometric modulator to another circuit. As shown in FIG. 10A, the connection bump 1040 may connect to the interferometric modulator indirectly, through other circuitry. In some embodiments the connection bump may directly connect to the device through the via 1006. Such an embodiment is shown in FIG. 9.

FIG. 10B shows a top view of the structures of FIG. 10A fabricated above the encapsulation layer 34, indicating their relative arrangement in the orientation depicted. The connection bump 1040, the diode 1014, the resistor 1012, the capacitor 1010, and the inductor 1008 are each shown as well as certain interconnect 1016 layers which electrically connect the structures.

While the above detailed description has shown, described, and pointed out novel features as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A method of manufacturing a display device, comprising:

providing a transmissive substrate;

forming a plurality of individually addressable interferometric light modulators on the substrate, wherein forming each of the interferometric light modulators includes forming a partially reflective optical stack on the substrate, the optical stack including a first electrode;

depositing a sacrificial layer over the optical stack;

forming a reflective layer over the sacrificial layer, the reflective layer including a second electrode;

removing the sacrificial layer to form an interferometric cavity between the optical stack and the reflective layer, wherein upon removing the sacrificial layer the reflective layer becomes movable through the cavity such that the reflective layer can be moved to an actuated position and to an unactuated position based on a voltage applied between the optical stack and reflective layer;

forming a conductive interconnect layer over the reflective layer and electrically connected to a portion of the reflective layer;

forming active circuitry including at least one of a diode, a transistor, and a zener diode connected to the interconnect layer; and forming a conductive connector connected on one end to the active circuitry and configured to connect to an external device to control said modulator through said connector, wherein the active circuitry is connected to the connector and disposed between the interconnect and the connector.

2. The method of claim 1, further comprising forming a via connecting the reflective layer to the interconnect.

3. The method of claim 1, further comprising forming an encapsulation layer above the reflective layer, hermetically sealing the display device.

4. The method of claim 1, wherein the plurality of modulators comprise at least 90 percent of the interferometric modulators in an array of interferometric modulators.

5. The method of claim 1, wherein the connectors of the plurality of modulators collectively comprise a plurality of connector bumps.

6. The method of claim 4, wherein the connector bumps are arranged with a pitch between about 40 microns and about 60 microns.

7. The method of claim 1, further comprising forming a plurality of posts that support the reflective layer.

8. The method of claim 1, wherein each modulator is characterized by at least two states and wherein the connector is configured to conduct a signal to control the state of the modulator associated with the connector.

9. The method of claim 1, further comprising:
providing a display comprising the display device;
providing a processor that is configured to communicate with said display, said processor being configured to process image data; and
providing a memory device that is configured to communicate with said processor.

10. The method of claim 9, further comprising electrically connecting a driver circuit to the first electrode and the second electrode, the driver circuit configured to send at least one signal to the display.

11. The method of claim 9, further comprising a providing a controller configured to send at least a portion of the image data to the driver circuit.

12. The method of claim 9, further comprising providing an image source module configured to send said image data to said processor.

13. The method of claim 12, wherein the image source module comprises at least one of a receiver, transceiver, and transmitter.

14. The method of claim 9, further comprising providing an input device configured to receive input data and to communicate said input data to said processor.

* * * * *